(12) United States Patent
Basham et al.

(10) Patent No.: US 11,772,025 B1
(45) Date of Patent: Oct. 3, 2023

(54) INDUSTRIAL FILTER ASSEMBLY ENHANCEMENT

(71) Applicant: W. L. Gore & Associates, Inc., Newark, DE (US)

(72) Inventors: Daniel E. Basham, Newark, DE (US); Stephen M. Brouse, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 18/119,938

(22) Filed: Mar. 10, 2023

Related U.S. Application Data

(60) Provisional application No. 63/394,488, filed on Aug. 2, 2022.

(51) Int. Cl.
   *B01D 46/10* (2006.01)
   *B01D 46/44* (2006.01)

(52) U.S. Cl.
   CPC ............ *B01D 46/10* (2013.01); *B01D 46/44* (2013.01)

(58) Field of Classification Search
   CPC .. B01D 46/0027; B01D 46/026; B01D 46/71; B01D 46/02; B01D 46/06; B01D 46/10; B01D 46/44; B01D 46/521
   USPC ...................... 55/302, 365, 379; 95/280, 281
   See application file for complete search history.

(56) References Cited

U.S. PATENT DOCUMENTS

| | | | |
|---|---|---|---|
| 4,344,781 A * | 8/1982 | Higgins | ............... B01D 46/026 55/379 |
| 4,690,700 A | 9/1987 | Franklin | |
| 5,484,523 A | 1/1996 | Bjornsson | |
| 6,110,243 A | 8/2000 | Wnenchak et al. | |
| 8,114,201 B2 | 2/2012 | Gebert et al. | |
| 8,312,997 B2 | 11/2012 | Hahn et al. | |
| 8,602,106 B2 | 12/2013 | Lopez | |
| 9,616,371 B1 * | 4/2017 | Clements | ............... B01D 46/71 |
| 10,040,704 B2 | 8/2018 | Ning et al. | |
| 10,052,579 B2 * | 8/2018 | Hallgren | ................... B04C 7/00 |
| 10,173,172 B2 * | 1/2019 | Hartbrich | ........... B01J 20/28038 |
| 10,286,350 B1 * | 5/2019 | Clements | ........... B01D 39/1623 |
| 10,695,775 B1 * | 6/2020 | Hedrick | .................... B04C 3/00 |
| 10,717,050 B2 | 7/2020 | Jons et al. | |
| 10,773,202 B2 * | 9/2020 | Johnson | ............... B01D 46/521 |
| 10,994,237 B2 * | 5/2021 | Spiegel | .............. B01D 46/0027 |
| 11,161,079 B2 | 11/2021 | Enomura et al. | |
| 2005/0269256 A1 | 12/2005 | Haq et al. | |
| 2006/0008396 A1 | 1/2006 | Wursthorn et al. | |
| 2013/0219842 A1 * | 8/2013 | Strugalski | .............. B01D 46/02 55/379 |

(Continued)

FOREIGN PATENT DOCUMENTS

| | | |
|---|---|---|
| CN | 114797307 A | 7/2022 |
| DE | 3936781 A1 | 5/1991 |

(Continued)

*Primary Examiner* — Minh Chau T Pham

(57) ABSTRACT

Provided herein are filter assemblies that more effectively harness the energy of a cleaning pulse. Specifically, the filter assembly may have a direction-dependent flow resistance by including a flow control component positioned downstream of the filter component and the support structure which prevents the fluid stream from a cleaning pulse from dissipating through the filter component as it cleans but allows sufficient fluid stream flowing in the forward direction through the filter component during normal operation.

26 Claims, 15 Drawing Sheets

(56) References Cited

U.S. PATENT DOCUMENTS

| | | | |
|---|---|---|---|
| 2013/0255204 A1* | 10/2013 | Zhang | ............... B01D 46/06 55/379 |
| 2021/0023483 A1 | 1/2021 | Takahashi | |
| 2021/0283610 A1 | 9/2021 | Kapur et al. | |

FOREIGN PATENT DOCUMENTS

| | | |
|---|---|---|
| JP | 2009-197686 A | 9/2009 |
| JP | 7213840 B2 | 1/2023 |
| WO | 2015/173981 A1 | 11/2015 |
| WO | 2019/094042 A1 | 5/2019 |

* cited by examiner

INDUSTRIAL FILTER ASSEMBLY ENHANCEMENT

FIELD

The present disclosure relates generally to filter assemblies having a direction-dependent flow resistance, the filter assemblies including a filter component and a flow control component.

BACKGROUND

The removal of particulates from a fluid stream has long been a practice in a variety of industrial fields. Conventional means for filtering particulates and the like from fluid streams include, but are not limited to, filter assemblies (e.g., filter bags), filter tubes, filter cartridges and filter panels. These filter elements are typically oriented into a filtration system, often referred to as a filter baghouse, for filtering such particulates. Such filtration systems may be either cleanable or non-cleanable, depending on the requirements of the system operation.

The separation of particulate matter from industrial fluid streams is often accomplished using laminate filters. These textile-based laminate filters remove particulates from fluid streams. When the resistance to flow or pressure drop through the textile caused by accumulation of particulate on the filter becomes significant, the filter must be cleaned, and the particulate removed from the filter.

It is common in the industrial filtration market to characterize the type of filter assemblies by the method of cleaning. The most common types of cleaning techniques are reverse air, shaker, and pulse-jet. Reverse air and shaker techniques are considered low energy cleaning techniques.

In reverse air filtration techniques, particulate collects on the interior of the bag. During cleanings, a gentle backwash of air collapses the bag and fractures the dust cake off the bag, which exits the bottom of the bag into a hopper.

Shaker mechanisms also clean dust cakes that collect on the inside of a bag. The top of the bag is attached to an oscillating arm which creates a sinusoidal wave in the bag to dislodge the dust cake.

In pulse-jet filtration, the particulate is captured on the outside of the bag. Pulse-jet cleaning techniques employ a short pulse of compressed air that enters the interior top portion of a filter assembly. In pulse-jet filtration, the filter assembly may be oriented vertically with an open portion at the top (i.e., the interior top portion). The energy of this cleaning pulse expands the filter assembly, knocking off the dust cake. The bag will typically snap back to a cage support and go right back into service collecting particulate.

Of the three cleaning techniques, pulse-jet is the most stressful on the filter component. However, in recent years, industrial process engineers have increasingly selected pulse-jet baghouses for dust collection applications because of:
1. Smaller unit size (sometimes as much as ½ or ¼ the size of shakers and reverse air filtration) due to:
   (A) higher volumetric airflow/cloth area ratio (higher operating velocity through a filter component); and
   (B) on-line cleaning allows the unit to be designed at the desired velocity, hence there is no need for additional filter component area to allow for off-line cleaning.
2. Minimal number of moving parts.
3. Lower number of bags to replace.

In a pulse-jet baghouse, filter assemblies are inserted into the baghouse with a metal cage on the inside to keep them from collapsing. Dirty fluid containing dust enters the baghouse on the outer side of the bag where the dust accumulates on the surface. The cleaned fluid (e.g., gas) travels through the bag and out of the baghouse. When a sufficient amount of dust has accumulated on the outside of the bag causing an increased amount of pressure, the pulse-jet baghouse sends a pulse of high pressure air vertically down the bag through the interior top portion. The accumulated dust is forced off the bag for collection in the lower portion of the baghouse by the high pressure air and/or the movement in the bag caused by the pressure pulse moving along the filter and down the bag. The movement in the bag may be a result of high pressure air causing a pressure spike inside the bag, thus imparting a stress on the bag.

In some instances, the pressure pulse does not travel far enough along the length of the filter assembly, which may cause insufficient cleaning towards the bottom of the bag. In addition, this cleaning process may occur multiple times an hour to maintain sufficient fluid flow through the bag.

U.S. Pat. No. 6,110,243 is directed to filter assemblies including a support structure, such as a support cage of metal, plastic, or the like, and a filter component of expanded PTFE membrane(s) without a backing material or layer. As described, the filter assembly further includes a support cover, or cage cover, which fits over the exterior surface of the support, or cage, to prevent contact of the filter component with the cage.

Generally, higher energy pulses result in higher pressure. Industry guidelines suggest that pulses may range from 172-690 kPa (25-100 psi). However, even with high pressure pulsing, pulse jet systems may still fail to effectively remove dust from the surface causing their system to run at high differential pressures which in turn result in process inefficiency in the form of higher energy cost or lost throughput. Furthermore, a general trade-off exists between effectiveness of cleaning and product life. As the cleaning pulse causes the mechanical integrity of the filter assembly to erode over time, cleaning more frequently or with increased pressure may decrease product life.

A need for improving cleaning efficiency and more even pressure distribution along the length of the filter assembly exists for filter assemblies. Therefore, it is advantageous to provide an improved filter assembly directed to overcoming one or more of the limitations set forth above.

SUMMARY

Provided herein are filter assemblies that more effectively harness the energy of a cleaning pulse. Specifically, the filter assembly has a direction-dependent flow resistance by including a flow control component positioned downstream of the filter component which prevents the air from a cleaning pulse from dissipating through the filter component as it cleans but allows sufficient fluid stream flowing in the forward direction through the filter component during normal operation.

According to one embodiment ("Embodiment 1"), the disclosure relates to a filter assembly for filtering particulates includes a filter component and a flow control component. The filter assembly is capable of having a direction-dependent flow resistance having a first flow resistance in a first direction when exposed to a first fluid stream and a second flow resistance in a second direction when exposed to a second fluid stream.

Embodiment 2 is the filter assembly of Embodiment 1, wherein the first fluid stream and the second fluid stream are the same or are different.

Embodiment 3 is the filter assembly of Embodiment 1 or 2, wherein the first fluid stream is a gas stream including particulates.

Embodiment 4 is the filter assembly of Embodiments 1 to 2, wherein the second fluid stream has a pressure of from 0.20 to 760 kPa.

Embodiment 5 is the filter assembly of Embodiment 4, wherein the second fluid stream is a pulse jet air stream pulsing at a pressure of from 1 to 760 kPa.

Embodiment 6 is the filter assembly of Embodiment 4, wherein the second fluid stream is a reverse air flow stream having a pressure of from 0.20 to 1 kPa.

Embodiment 7 is the filter assembly of Embodiments 1 to 6, wherein the first direction is opposite to the second direction.

Embodiment 8 is the filter assembly of Embodiments 1 to 7, wherein a ratio of the first flow resistance to the second flow resistance ranges from less than 0.01% to 99%.

Embodiment 9 is the filter assembly of Embodiments 1 to 8, wherein the flow control component is capable of modulating an amount of the second fluid stream flowing through the filter component by altering a surface area of the filter component that is exposed to the second fluid stream.

Embodiment 10 is the filter assembly of Embodiments 1 to 5 and 7 to 9, wherein when the filter assembly is exposed to the second fluid stream in the second direction, a pressure inside the filter assembly is increased compared to the same second fluid stream without the flow control component.

Embodiment 11 is the filter assembly of Embodiments 1 to 10, wherein the filter assembly further comprises a support structure.

Embodiment 12 is the filter assembly of Embodiments 1 to 10, wherein the flow control component is disposed downstream of the filter component with respect to the first direction of the first fluid stream.

Embodiment 13 is the filter assembly of Embodiments 1 to 12, wherein the flow control component alternates between a slack non-masking state and an expanded masking state relative to the filter component.

Embodiment 14 is the filter assembly of Embodiment 13, wherein the flow control component is in the expanded masking state and at least a portion of a flow control surface of the flow control component is in contact with a surface of the filter component.

Embodiment 15 is the filter assembly of Embodiment 14, wherein the flow control component masks the surface of the filter component to decrease the surface area of the filter component exposed to the second fluid stream by 10 to 100%.

Embodiment 16 is the filter assembly of Embodiment 15, wherein the flow control component includes a plurality of flow control passages.

Embodiment 17 is the filter assembly of Embodiment 16, wherein the flow control component has a percentage open area of from 0.01% to 50% compared to the total surface area of the flow control component.

Embodiment 18 is the filter assembly of Embodiment 17, wherein, when the flow control component has a percentage open area of from 0.01% to 50% compared to the total surface area of the flow control component, the surface area of the filter component exposed to the second fluid stream is decreased by 50% to 100%.

Embodiment 19 is the filter assembly of Embodiment 16, wherein the flow control passages include openings with an average size of from 0.0001 to 100,000 mm$^2$.

Embodiment 20 is the filter assembly of Embodiment 16, wherein the flow control passages include slits having a length of from greater than 0 to 10 m.

Embodiment 21 is the filter assembly of Embodiments 1 to 20, wherein the flow control component includes at least one flow control passage capable of being in an open state or a closed state.

Embodiment 22 is the filter assembly of Embodiment 21, wherein the at least one flow control passage includes a flap.

Embodiment 23 is the filter assembly of Embodiments 1 to 22, wherein the first fluid stream passing through the filter assembly in the first direction at a first velocity experiences a first flow resistance, and wherein the second fluid stream passing through the filter assembly in the second direction at a second velocity experiences a second flow resistance, and the first flow resistance is different from the second flow resistance.

Embodiment 24 is the filter assembly of Embodiments 1 to 23, wherein the second flow resistance is greater than the first flow resistance.

Embodiment 25 is the filter assembly of Embodiments 1 to 24, wherein the first fluid stream passing through the filter assembly in the first direction experiences a first flow resistance of less than 4,000 (min*Pa)/m.

Embodiment 26 is the filter assembly of Embodiment 25, wherein the second fluid stream passing through the filter assembly in the second direction experiences a second flow resistance of more than 10 (min*Pa)/m.

Embodiment 27 is the filter assembly of Embodiments 1 to 26, wherein the filter assembly is cleanable.

Embodiment 28 is the filter assembly of Embodiments 1 to 27, wherein the flow control component includes a sheet-like material; wherein the sheet-like material includes a porous sheet-like material, a non-porous sheet-like material or combinations thereof.

Embodiment 29 is the filter assembly of Embodiment 28, wherein the non-porous sheet-like material includes a metal or a polymeric membrane.

Embodiment 30 is the filter assembly of Embodiment 28, wherein the sheet-like material includes a silicone, a silicone elastomer, a fluorocarbon, a fluorocarbon elastomer, a microporous polymer that has been densified or filled to remove at least some of the pores, a polyacrylate, an ethylene (meth)acrylic copolymer, a polyimide, a polyether ether ketone (PEEK), a polyester, polybutylene terephthalate, polyethylene terephthalate, a microporous polymer, wherein the polymer is polytetrafluoroethylene (PTFE), polypropylene (PP), polyethylene (PE), expanded PTFE, fluorinated ethylenepropylene (FEP), perfluoroalkoxy polymer (PFA), ultra-high molecular weight polyethylene (UHMWPE), nitrocellulose, triacetyl cellulose, polyimide, polycarbonate, polysulfone, polyvinyl chloride, polyvinylidene fluoride, acrylate copolymer, or a combination thereof.

Embodiment 31 is the filter assembly of Embodiment 28, wherein the porous sheet-like material has a flow resistance of larger than 16.5 (min*Pa)/m.

Embodiment 32 is the filter assembly of Embodiments 1 to 31, wherein the filter component includes a woven felt, non-woven felt, polyester, cotton, nylon, a fiberglass material, a catalytic filter material, a sorbent filter material, or a combination thereof.

Embodiment 33 is the filter assembly of Embodiments 1 to 31, wherein the filter component includes a felt or a fiber made of PTFE, polyester, polypropylene, polyphenylene sulfide, aramid, polyimide, or a combination thereof.

Embodiment 34 is the filter assembly of Embodiments 1 to 31, wherein the filter component includes commingled fiber and filament including fiberglass and PTFE.

Embodiment 35 is the filter assembly of Embodiments 1 to 31, wherein the filter component includes a material capable of withstanding high temperature applications of greater than 400° C.; wherein the material includes woven PTFE, fiberglass or polyimide.

Embodiment 36 is a baghouse filter system including a housing having an inlet and an outlet; a tube sheet positioned within the housing between the inlet and outlet; and one or more of the filter assemblies of any of Embodiments 1 to 36 mounted to the tube sheet.

Embodiment 37 is a method of cleaning a bag house filter system including providing a cleaning fluid stream at a pressure of from 0.20 to 760 kPa through one or more of the filter assemblies of any one of Embodiments 1 to 36 mounted to a tube sheet, thereby causing an expansion of the flow control component. In some embodiments, the expansion exerts and dissipates mechanical pressure on the filter component in response to the cleaning pulse, thereby inducing cleaning of the filter component.

Embodiment 38 is a flow control component for use in a filter assembly including one or more flow control passages. In some embodiments, the filter assembly is capable of having a direction-dependent flow resistance having a first flow resistance in a first direction and a second flow resistance in a second direction when exposed to a fluid stream.

Embodiment 39 is the flow control component of Embodiment 38, wherein the flow control component has a percentage open area of from 0.01% to 50% compared to the total area of the flow control component.

Embodiment 40 is the flow control component of Embodiment 39, wherein, as the percentage open area of the flow control component decreases, the difference between the first flow resistance and the second flow resistance increases.

Embodiment 41 is the flow control component of Embodiment 40, wherein the flow control passages include openings having an average size of from 0.0001 to 100,000 mm$^2$.

Embodiment 42 is the flow control component of Embodiment 41, wherein, as the average size of openings decreases, the difference between the first flow resistance and the second flow resistance increases.

Embodiment 43 is the flow control component of Embodiment 42, further including one or more flaps such that the one or more flow control passages are capable of being in an open state or a closed state.

The foregoing Embodiments are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Definitions and Terminology

Figure 1:
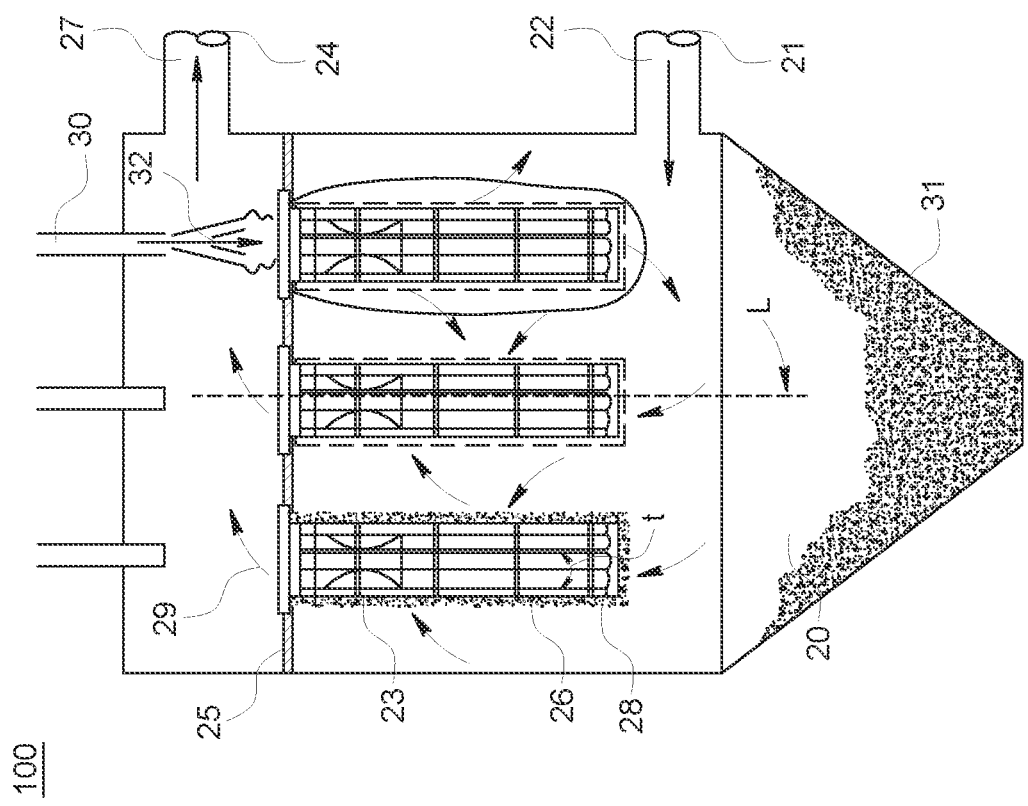
FIG. 1 is a schematic view of a pulse-jet baghouse in accordance with embodiments disclosed herein.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

As used herein, a "filter assembly" may be used in a baghouse for filtering particulates from a fluid stream, such as an exhaust gas stream. A filter assembly may be in the form of a filter bag.

A "filter component" may include at least one filter media for collecting the particulates from the fluid stream, for example from the gas stream. A filter assembly may include one or more filter components. The filter component includes at least one filter media which is fluid permeable while collecting particulates on an upstream surface of the filter component and/or at least partially within the structure of the filter component.

The term "fluid stream" may cover gas streams or air flows. The gas streams may include a gas stream from a number of industrial processes, for example, a flue gas stream or an exhaust gas stream from combustion plants containing the reaction products of fuel and combustion air such as particulate matter (dust), sulfur oxides, nitrogen oxides, and carbon monoxide. In embodiments, there may be a first fluid stream and a second fluid stream.

The term "normal operation" means a fluid stream is flowing through a filter assembly in a direction such that particulates in the fluid stream are removed and collected by the filter assembly. A fluid stream flowing under "normal operation" may be a first fluid stream.

The term "normal direction" or "first direction" is the direction in which the fluid stream flows during normal operation. In some embodiments there may be a first direction and a second direction. In embodiments, the normal direction may be the first direction which is opposite to the second direction. A fluid stream flowing in a normal direction may be a first fluid stream. In addition, there may be also a third direction for a fluid stream flowing in a longitudinal direction along the length of the filter assembly.

The term "opposite direction" or "second direction" is a direction in which the fluid stream flows through a filter assembly during cleaning pulses or flows. In some embodiments the second direction may be the opposite direction. A fluid stream flowing in an opposite direction may be a second fluid stream.

A "forward flow" describes a fluid stream flowing in normal direction. In some embodiments, the fluid stream may flow in a direction perpendicular to a longitudinal direction along the length of the filter assembly towards the center of the filter assembly.

An "opposite flow" describes a fluid stream flowing in an opposite direction compared to forward flow.

An "upstream fluid flow" describes a fluid stream including particulates before flowing through a filter assembly.

A "downstream fluid flow" describes a fluid stream relatively cleaner than an upstream fluid flow after flowing through a filter assembly.

In some embodiments, there may be a first flow and a second flow, the first flow may be a forward flow, and the second flow may be an opposite flow. In some embodiments, the opposite flow describes the fluid stream flowing in a direction perpendicular to a longitudinal direction along the length of the filter assembly away from the center of the filter assembly. In addition, there may be also a third flow where the downstream fluid flow (e.g., cleaned fluid inside the filter assembly) flows in a longitudinal direction along the length of the filter assembly when leaving the filter assembly.

The term "flow resistance" describes a filter assembly's resistance to a fluid stream flowing through the filter assembly.

A "flow control component" may be used in a filter assembly such that the filter assembly has a direction-dependent flow resistance.

The term "direction-dependent flow resistance" describes a filter assembly having different flow resistance depending on the direction of the flow. In some embodiments, the filter assembly may have a first flow resistance in normal direction and a second flow resistance in opposite direction. In embodiments, the filter assembly may have a first flow resistance in a first direction when exposed to a first fluid flow and a second flow resistance in a second direction when exposed to a second fluid flow.

Description of Various Embodiments

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

The filter assemblies described herein may be used in a wide variety of applications where pollutant control or product capture is necessary. This includes, for example, power plants, steel mills, chemical producers, and other industrial companies where high particulate collection efficiency is desired. An exemplary embodiment according to the invention is a filter assembly that is used in cement baghouses. The filter assemblies described herein may be used in a baghouse for filtering particulates from a fluid stream, such as an exhaust gas stream. In one embodiment, a high-efficiency dust-collecting filter assembly may be provided.

The disclosed filter assemblies are useful for filtering particulates from the fluid stream and comprise a filter component and a flow control component, wherein the filter assembly is capable of having a direction-dependent flow resistance having a first flow resistance in a first direction when exposed to a first fluid stream and a second flow resistance in a second direction when exposed to a second fluid stream. During normal operation, the filter assembly may collect particulates on the upstream surface and the collected particulates may be removed several times over the course of operation by cleaning. For example, the filter assembly may be cleaned by removing the particulates that collect as a dust cake on the filter assembly using cleaning techniques such as reverse air, shaker, and pulse-jet.

Various embodiments described herein relate to the filter assembly having a direction-dependent flow resistance. The filter assembly may include a filter component and a flow control component. In one embodiment, the filter assembly may include an additional support structure. In embodiments where the fluid stream is flowing in normal direction (e.g., a first fluid stream), the flow control component may be downstream of the filter component. In some embodiments, the flow control component may be positioned between the filter component and the support structure. In some embodiments, the support structure may be positioned between the flow control component and the filter component.

In some embodiments, the flow control component may be integrated into the filter component. In some embodiments, the flow control component may be integrated into the support structure. In some embodiments, the filter assembly may include a flow control component integrated into a support structure, forming a flow control unit.

The flow control component may be configured such that the filter assembly has a direction-dependent flow resistance. Without wishing to be bound by any particular theory, it is believed the configurations disclosed herein address problems associated with cleaning efficiency and product life by providing filter assemblies with a more even pressure distribution and increased overall pressure along the length of the filter assemblies during the cleaning cycle. The pressure distribution will be discussed in more details with regard to FIG. 10 below.

In one such configuration, the flow control component may be configured such that there is no opposite direction flow from a pulse of air (second fluid stream) passing to the filter component. In such a configuration the flow control component comprises an air-impermeable material or a non-porous sheetlike material, thus fully harnessing the pulse energy into an expanding and masking motion of the flow control component against a surface of the filter component. The expanding and masking motion of the flow control component causing a pressure pulse towards the filter component for cleaning off the upstream surface of the filter component.

In another configuration, the flow control component may be configured to allow fluid flow through the filter assembly in both normal and opposite direction, but with the filter assembly having different flow resistances. In such a configuration the flow control component may comprise a porous sheetlike material or a non-porous sheetlike material comprising one or more flow control passages or openings. In yet another embodiment, the flow control component may be configured such that a fluid stream flowing in normal direction (first fluid stream) may experience a first flow resistance, and fluid stream flowing in opposite direction (second fluid stream) may experience a second flow resistance that is larger than the first flow resistance. During normal operation, a fluid stream is able to flow through the filter assembly in the normal direction with minimal added flow resistance.

The flow control component may exist in a slack non-masking state during normal operation (e.g., a first fluid stream) and may exist in an expanded masking state during a cleaning pulse or opposite flow (e.g., a second fluid stream). In some embodiments, in a slack non-masking state, the flow control component does not mask the filter component, and the fluid stream flowing through the filter assembly in normal direction experiences a first flow resistance. In certain embodiments, in an expanded masking state, at least a portion of the flow control component is in contact with a surface of the filter component, thus masking the filter component, and the fluid stream flowing through the filter assembly in opposite direction experiences a second flow resistance that is larger than the first flow resistance due to the expanding and masking motion of the flow control component against the surface of the filter component.

In some embodiments, the filter assembly may include a flow control component that can be a porous or non-porous sheet-like material, e.g., a membrane. The sheet-like materials allow the passage of fluid (e.g., gas). The filter assembly can maintain differential pressure rise of less than 0.7 MPa, e.g., less than 0.5 MPa or less than 0.1 MPa, described in terms of the ISO 11057 test method, described below.

The disclosed filter assembly has a higher flow resistance in the second direction when compared to the flow resistance of a filter assembly in the second direction without the flow control component. The flow resistance of the flow control component in the second direction can essentially be infinite, for example, in the case of a flow control component that is non-porous and/or has no passages or openings. In some embodiments, the flow control component may have a flow resistance in the second direction that is greater than 10 (min*Pa)/m, or greater than 11 (min*Pa)/m, or greater than 12 (min*Pa)/m, or greater than 13 (min*Pa)/m, or greater than 14 (min*Pa)/m, or greater than 15 (min*Pa)/m, or greater than 16 (min*Pa)/m, or greater than 16.5 (min*Pa)/m, or greater than 16.8 (min*Pa)/m, or greater than 17.1 (min*Pa)/m, or greater than 17.4 (min*Pa)/m, or greater than 17.7 (min*Pa)/m, or greater than 18.0 (min*Pa)/m, or greater than 18.3 (min*Pa)/m, or greater than 18.6 (min*Pa)/m, or greater than 18.9 (min*Pa)/m, or greater than 19.3 (min*Pa)/m, or greater than 20 (min*Pa)/m, or greater than 30 (min*Pa)/m, or greater than 40 (min*Pa)/m, or greater than 50 (min*Pa)/m, or greater than 60 (min*Pa)/m, or greater than 70 (min*Pa)/m, or greater than 80 (min*Pa)/m, or greater than 90 (min*Pa)/m, or greater than 100 (min*Pa)/m, or greater than 150 (min*Pa)/m, or greater than 200 (min*Pa)/m, or greater than 250 (min*Pa)/m, or greater than 300 (min*Pa)/m, or greater than 500 (min*Pa)/m, or greater than 1000 (min*Pa)/m, or greater than 1500 (min*Pa)/m, or greater than 2000 (min*Pa)/m.

In the first direction, when exposed to the first fluid stream, the filter assembly can have a flow resistance that is less than 4000 (min*Pa)/m. In other embodiments, the fluid assembly can have a flow resistance that is less than 3500 (min*Pa)/m, or less than 3000 (min*Pa)/m, or less than 2500 (min*Pa)/m, or less than 2000 (min*Pa)/m, or less than 1500 (min*Pa)/m, or less than 1000 (min*Pa)/m, or less than 900 (min*Pa)/m, or less than 800 (min*Pa)/m, or less than 700 (min*Pa)/m, or less than 600 (min*Pa)/m, or less than 500 (min*Pa)/m, or less than 400 (min*Pa)/m, or less than 300 (min*Pa)/m, or less than 200 (min*Pa)/m, or less than 150 (min*Pa)/m, or less than 125 (min*Pa)/m, or less than 100 (min*Pa)/m, or less than 90 (min*Pa)/m, or less than 80 (min*Pa)/m, or less than 70 (min*Pa)/m, or less than 60 (min*Pa)/m, or less than 50 (min*Pa)/m, or less than 40 (min*Pa)/m, or less than 30 (min*Pa)/m, or less than 25 (min*Pa)/m, or less than 20 (min*Pa)/m, or less than 15 (min*Pa)/m, or less than 12.5 (min*Pa)/m, or less than 10 (min*Pa)/m.

In some instances, the sheet-like material of the flow control component may include a metal (e.g., aluminum, stainless steel, and copper), or a polymeric membrane. The polymeric membrane may be a non-porous or porous membrane. Suitable sheet-like materials that are non-porous polymeric membranes may include, for example, a silicone, a silicone elastomer, a fluorocarbon, a fluorocarbon elastomer, a microporous polymer that has been densified to remove at least some of the pores, a polyacrylate, an ethylene (meth)acrylic copolymer, a polyimide, a polyether ether ketone (PEEK), a polyester, polybutylene terephthalate, polyethylene terephthalate, or a combination or a blend thereof. In some embodiments, the flow control component can be a porous sheet-like material or porous membrane that may include, for example, a microporous polymer, wherein the polymer is polytetrafluoroethylene (PTFE), polypropylene (PP), polyethylene (PE), expanded polyethylene (ePE), expanded PTFE, fluorinated ethylenepropylene (FEP), perfluoroalkoxy polymer (PFA), ultra-high molecular weight polyethylene (UHMWPE), nitrocellulose, triacetyl cellulose, polyimide, polycarbonate, polysulfone, polyvinyl chloride, polyvinylidene fluoride, acrylate copolymer, a microporous fluoropolymer film; a textile like material, or a combination thereof.

In some embodiments, the flow control component may include a porous membrane that may be PTFE or expanded PTFE ("ePTFE") sheet-like material. The ePTFE membranes may have an average pore diameter that is 0.7 microns or less, e.g., 0.5 microns or less. In some embodiments, the porous membrane may include a fluoropolymer membrane or a polyester membrane. A suitable fluoropolymer membrane includes polytetrafluoroethylene (PTFE) that is prepared by a number of different methods, including expanding the PTFE to form expanded polytetrafluoroethylene (ePTFE). Other suitable fluoropolymers may include polyvinylidene fluoride ("PVDF"), tetrafluoroethylene-hexafluoropropylene copolymer ("FEP"), tetrafluoroethylene-(perfluoroalkyl) vinyl ether copolymer ("PFA"), or the like. In some embodiments, the flow control component is an expanded polymer that has been densified to remove at least a portion of the pores.

The ePTFE membrane may have a structure of a plurality of nodes and/or a plurality of fibrils that creates pores. In some embodiments, the ePTFE membrane is substantially fibrillated and contains a few nodes. The use of PTFE provides good heat resistance and chemical inertness. Porous ePTFE provides increased strength and stability to withstand the stress caused by pulse jet cleaning. These stresses on the membrane are of two types. One caused by the sudden expansion during pulse jet cleaning. The other caused by sudden collapsing of the bag against its support structure. The stresses are incurred repeatedly over the lifetime of the filter assembly, which may be several years. For some applications of the filter assembly, there may be more than a million pulse cycles in each year of operations.

In certain embodiments, the filter component may include a filter media made of a woven felt, non-woven felt, polyester, cotton, nylon, a fiberglass material, a catalytic filter material, or a sorbent filter material and optionally a support structure. In some embodiments, the filter component includes a felt or a fiber made of PTFE, polyester, polypropylene, polyphenylene sulfide, aramid, polyimide or a combination thereof. In certain embodiments, the filter component may include commingled fiber and filament including fiberglass and PTFE. In some embodiments, the filter component includes a material capable of withstanding high temperature applications of greater than 400° C.—the material may be woven PTFE, fiberglass or polyimide. The filter component may also include laminates comprising porous filter membranes, for example, porous ePTFE or ePE membranes and woven or non-woven felts as described above.

In another embodiment, the filter assembly may include a filter component and a flow control component, the filter component having pores and the flow control component having optional flow control passages. In some embodiments, the flow control passages can be one or more openings in the flow control component. Each opening can independently take the form of a hole, a slit, a perforation, a flap, or a combination thereof. During normal operation, the flow control component may reside in a slack state. The slack state would allow the first fluid stream to flow through the pores of the filter component of the filter assembly, across the surface of the flow control component, and at least a portion of the first fluid stream may flow through any optional flow control passages or openings.

The flow control component can be incorporated into the filter assembly as a separable component or it can be attached to the filter component, for example, by one or more of adhesive, lamination, heat welding and/or stitching. The filter component can comprise pores to remove particulates from the first fluid stream and the flow control component can comprise one or more flow control passages that can be openings in the flow control component. In some embodiments, each flow control passage can independently be a hole, a slit, a perforation, a flap, or a combination thereof. In some embodiments, the flow control passage can be the open end of a tube-shaped flow control component. In general, the filter assemblies are tube-shaped, comprising a tube-shaped filter component and a tube-shaped flow control component. The filter component can be open at one end and closed at the other end and has a diameter that approximates the size of the support cage. In some embodiments, the filter component is sized so that it can provide a friction fit with the support cage, while in other embodiments, the filter component can be slightly larger than the support cage and may use fastening means to attach it to the support cage. The flow control component is also shaped like a tube, with an opening at one end and the opposite end being closed. The flow control component is oversized compared to the filter component. Making the flow control component with a larger diameter than the filter component can allow the first fluid stream to 'push' or 'bow' the flow control component into the open areas of the support cage, thereby allowing at least a portion of the first fluid stream to pass between the filter component and the flow control component.

During normal operation, when exposed to the first fluid stream, the flow control component is in a slack state, the first fluid stream can pass through the filter component and a portion of the first fluid stream (cleaned of at least a portion of the particulates) can flow in between the filter component and the flow control component and another portion of the first fluid stream can flow through the one or more flow control passages. Typically, the flow control component has a larger diameter when compared to the diameter of the filter component. This results in the flow control component being relatively loose on a support structure and can help to facilitate the portion of the fluid stream flowing between the flow control component and the filter component. When in the slack state, the flow control component may push into any of the open areas of the support structure.

During a pulse of the pulse-jet cycle, the filter assembly would expand outward into an expanded state, causing the flow control component layer to press against the filter component layer such that the flow control component layer is masking the filter component, and blocking the permeability or pores of the filter component layer except in the areas of the flow control passages or openings. In other words, during the cleaning cycle, the two layers of the filter assembly compress against each other to block the permeability outside of the flow control passages or openings or the pathway across the interface between the filter component and the flow control component. With most of or all of the surface area of the filter component masked or blocked by the flow control component, depending on the amount of optional flow control passages or openings in the flow control component, the cleaning airflow pulse would be diverted along the length of the filter assembly, converted into a more uniform mechanical movement. The more uniform mechanical movement may expand the filter component more efficiently, and thus may induce more efficient cleaning of the filter component.

FIG. 1 is a schematic view of a baghouse 100 in accordance with embodiments disclosed herein. As shown in FIG. 1, the opposite direction is indicated by arrow (t). The opposite direction may be in the direction of the circumferential width of the filter assembly, which is non-parallel to the filter assembly length, and in some embodiments may be perpendicular to the filter assembly length. As shown, the longitudinal direction is indicated by line (L) and is the direction along the length of the filter assembly.

A baghouse may include several filter assemblies. In a typical baghouse (e.g., the baghouse 100 in FIG. 1), each filter assembly may have a length from 0.3 m to 10 m and an internal diameter from 5 cm to 30 cm. The filter assembly may have dimensions that allow the filter assembly to be mounted to the baghouse, fitted over the support structure, or fitted with support structures. It should be understood that these dimensions are not necessarily limiting for the purposes of the present disclosure and the embodiments disclosed herein may be used in a wide variety of baghouses. In one embodiment, the filter component of a filter assembly may be pleated. In some embodiments, a pleated filter component may increase the filter area and thickness of the filter assembly and exposes the filter component to less particulates per filter area for a given filter radius, compared to a non-pleated filter component in the stream.

The filter assemblies of this disclosure may include a flow control component that provides a direction-dependent flow resistance to the filter assembly. This allows the filter assembly to be easily and efficiently cleaned while at the same time allow the use of a filter assembly with a higher air permeability. The flow control component may be positioned downstream of the filter component during normal flow. The filter assembly may have a variety of shapes and features depending on the operation and cleaning technique. In one embodiment, the filter assembly for pulse-jet cleaning may have a cuff at one end and an opening at the other that allows the filter assembly to at least partially surround a support structure.

As shown in FIG. 1, a baghouse 100 having a pulse-jet cleaning sequence is shown. Inside hopper 20, particulate laden fluid stream 21 enters the hopper at inlet 22 and passes through filter assembly 23 having a filter component. The filter component may include a filter media made of a woven felt, non-woven felt, polyester, cotton, nylon, a fiberglass material, a catalytic filter material, a porous membrane, a sorbent filter material or any combinations thereof, and optionally a support structure.

In some embodiments, the filter component includes a felt or a fiber made of, for example, PTFE, polyester, polypropylene, polyphenylene sulfide, aramid, polyimide or a combination thereof. In certain embodiments, the filter component may include commingled fiber and filament including fiberglass and PTFE. In some embodiments, the filter component includes a material capable of withstanding high temperature applications of greater than 400° C.—the material may be woven PTFE, fiberglass or polyimide. In some embodiments, the filter component of the filter assembly 23 may include one or more porous membranes to provide high fluid flow and good dust cake release. The porous membranes may be attached to the filter component using adhesives, lamination, welding, sewing, tacking, clamping, or other suitable attachment means. In some embodiments, the porous membranes may include polymers (e.g., fluoropolymers). In some embodiments, the porous membranes may include ePTFE.

Referring back to FIG. 1, tube sheet 25 inside hopper 20 prevents the fluid stream 21 from bypassing the filter assembly 23. The filter assembly 23 may include an internal supporting structure 26 in the form of a cage. The filtered fluid stream 24, after passing through the filter assembly 23 and out bag exit 29, exits the clean air compartment at outlet 27. In operation, particulate forms a dust cake 28 on the outside of the filter component, as shown in the bag on the left of the figure. Upon cleaning to remove the dust cake 28, air from pulse pipe 30 enters the filter assembly. This pulse of air 32 traveling along the longitudinal direction (L) expands the filter assembly 23, loosening the dust cake and thus causing particulate 31 to collect at the bottom of hopper 20.

In some embodiments, the particulate laden fluid stream 21 may be a first fluid stream and the pulse of air 32 may be a second fluid stream, and the first and second fluid stream may be different. In certain embodiments, for example when a second fluid stream is a reverse air stream, the first fluid stream and the second fluid stream may be the same. In other embodiments of the reverse air stream, the first fluid stream and the second fluid stream are different.

As seen in the bag on the right of FIG. 1, the pulse jet causes the filter assembly to expand. The repeated expansion and contraction of the filter assembly causes wear. It should be understood that other cleaning techniques also impart stresses on the filter assemblies. The advantages of the filter assemblies described herein include at least 1) having a direction-dependent flow resistance, 2) providing filter assemblies with a more even pressure distribution along the length of the filter assemblies, and 3) providing filter assemblies with an increased and more uniform pressure distribution along the length of the filter assemblies.

In some embodiments, the baghouse 100 may include a tube sheet positioned within the housing (e.g., the hopper 20) between the inlet 22 and outlet 27, and one or more filter assemblies mounted to the tube sheet according to embodiments disclosed in the present disclosure.

In a baghouse (e.g., the baghouse 100 of FIG. 1), the filter component should be able to withstand high temperatures without degradation. Depending on chemical and/or moisture content of the fluid stream, its temperature, and other conditions, filter components may be constructed from filter media including, for example, fiberglass, polyester, cotton, nylon, or other materials. Felts and fibers made of PTFE, polyester, polypropylene, polyphenylene sulfide, aramid, polyimide or a combination thereof may also be used as filter media for the filter component. Commingling of fibers and filaments, such as fiberglass and PTFE, may also be employed as filter component. For example, at high temperature applications of greater than 400° C., a woven PTFE, fiberglass or polyimide may be used as the filter component.

In some embodiments, the filter component may be a commercially available fabrics, for example, a felt. These felts may weigh from 300 to 1200 grams per square meter ($g/m^2$), or from 400 to 1100 $g/m^2$, or from 500 to 1000 $g/m^2$, or from 650 to 900 $g/m^2$. The felts may be reinforced with a multifilament woven scrim weighing from 100 to 250 $g/m^2$, or from 110 to 240 $g/m^2$, or from 120 to 230 $g/m^2$, or from 130 to 210 $g/m^2$. The scrim element can be made of any polytetrafluoroethylene (e.g., expanded or porous polytetrafluoroethylene). The felts may be made up of staple fibers and may be from about 1 cm to about 30 cm, or about 2 cm to about 28 cm, or about 3 cm to about 26 cm, or about 4 cm to about 24 cm, or about 5 cm to about 22 cm in length or may have a length encompassed within these ranges. In some embodiments, the felts may be made up of staple fibers having from about 1 to about 20 denier/filament, or from about 2 to about 18 denier/filament, or from about 3 to about 16 denier/filament, or from about 4 to about 14 denier/filament, or from about 5 to about 12 denier/filament, or from about 6 to about 10 denier/filament, or may have denier per filament encompassed within these ranges. In some embodiments, the felt may be a PTFE felt, a polyester felt, an aramid felt, a polypropylene felt, a polyphenylene sulfide felt, a polyimide felt, or a felt made from a combination of those polymers. Optionally, these felts may further comprise one or more of glass fibers, metal fibers or a combination thereof.

In one embodiment, there may be a further layer added to the filter component, such as a wrap of a non-woven polypropylene material or an adsorbent component for capturing mercury, other heavy metals, volatile organic compounds (VOCs), or other any desired components to be filtered on the downstream side of the filter component. In another embodiment, the filter component may include one or more catalysts. For example, the catalyst may be suitable for converting contaminants such as NOx, NH3, CO, dioxin, furan, or ozone. The catalyst may include an active material such as $TiO_2$, $V_2O_3$, $V_2O_5$, $WO_3$, $MnO_2$, Pt or $Al_2O_3$. With a catalyst, contaminants such as dioxins, furans, NOx, CO, and the like, can be effectively removed from a fluid stream.

Figure 2B:
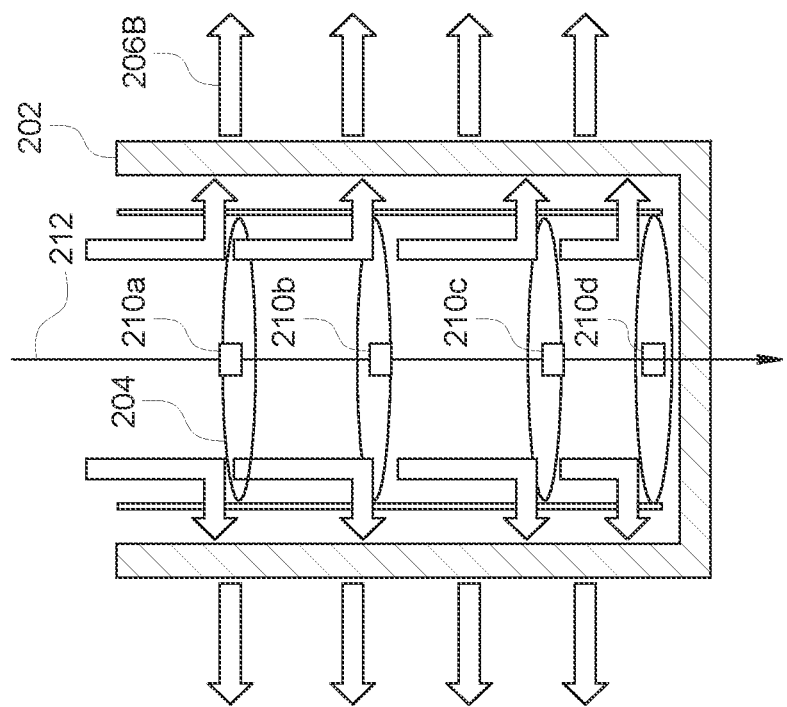
FIG. 2B is a schematic cross-sectional view of a filter assembly in cleaning pulse flow (also referred to herein as "opposite flow") for use in a pulse-jet baghouse, in accordance with the prior art.
Figure 2A:
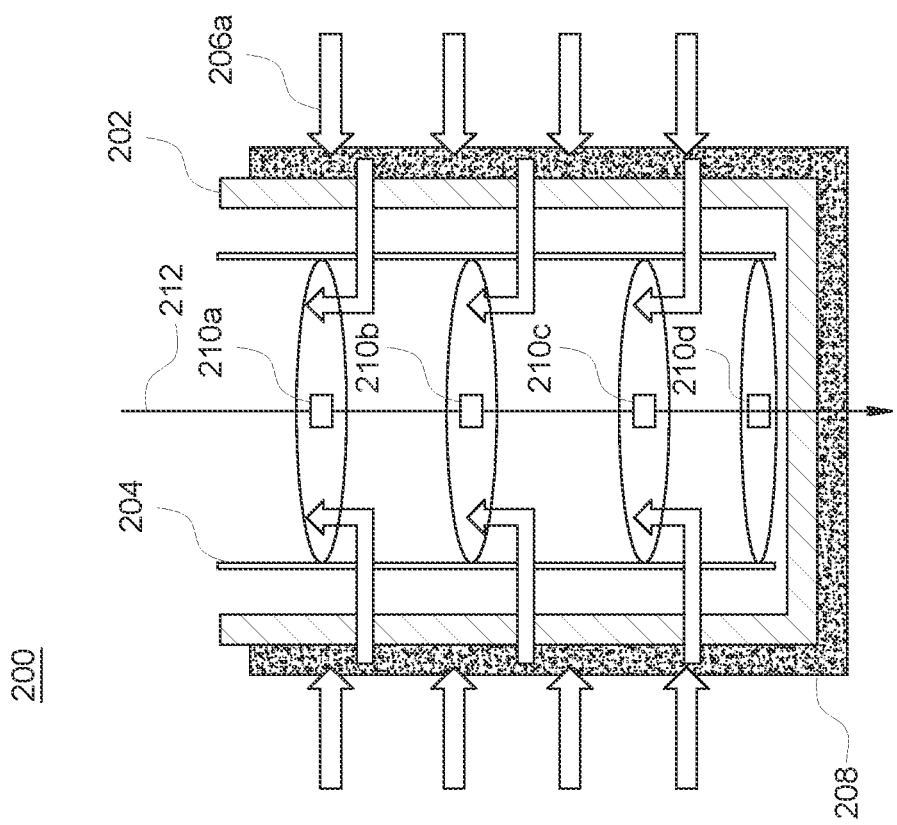
FIG. 2A is a schematic cross-sectional view of a filter assembly in forward flow (also referred to herein as "normal flow") for use in a pulse-jet baghouse, in accordance with the prior art.

FIG. 2A is a schematic view of a filter assembly 200 in forward flow (also referred to herein as "normal flow) for use in a pulse-jet baghouse, in accordance with the prior art; FIG. 2B is a schematic view of a filter assembly in cleaning pulse flow (also referred to herein as "opposite flow") for use in a pulse-jet baghouse, in accordance with the prior art.

As shown, the filter assembly 200 may include a filter component 202 having a filter media and optionally a porous membrane (not shown) attached to the filter media. The filter assembly 200 may further include a support structure 204. The support structure 204 that may be used in the filter assembly 200 can vary widely depending on a number of conditions, including the configuration of the filter assembly 200, the type of material to be filtered, the filtration system into which the filter assembly 200 will be incorporated, cleaning mechanism, and the like. For example, suitable support structures 204 may include cages, rings, or braces that may be fabricated from materials such as metals, plastics, and natural fibers, including woven or nonwoven forms, such as spunbonded polyester or nonwoven aramid felt materials. In one embodiment, the support structure 204 may be metal or plastic meshes. Wire supports cages may also be used as support structures. In some embodiments, the support structure 204 may be made of a relatively flexible material. In other embodiments, the support structure 204 may be a rigid self-supporting structure. The filter component 202 typically is in contact with the support structure 204 so that the filter component 202 is held in a relatively rigid manner so that flexing, bending and twisting of the filter assembly directions is minimized, but not eliminated.

In one embodiment, the support structure 204 includes a cage that may be constructed as one, unitary piece or assembled from multiple pieces. The cage may have a cover (not shown) to provide a barrier between the support structure 204 and the filter component 202. The cover may reduce contact between the filter component 202 and the support structure 204.

During normal operation, the fluid flow 206A passing through the filter assembly 200 is in a first direction. As shown in FIG. 2A, dust cakes 208 may accumulate on the filter component 202 as particles or particular matter from the fluid stream get collected by the filter component. During pulse-jet cleaning cycles, air pulses or streams 206B may flow through the filter assembly 200 in a second direction. The first direction of fluid flow 206A may be opposite to the second direction of air pulses or streams 206B.

In some embodiments, one or more pressure gauges 210a-d may be disposed along a longitudinal direction 212 to measure the pressure of the pulse flow distributed along the length of the filter assembly 200. As the filter assembly 200 is exposed to the pulse flow in a longitudinal direction along a length of the filter assembly 200, it may be readily appreciated that the pressure measured at each of the pressure gauges 210a-d is relatively low, as will be discussed in more details below.

Figure 3A:
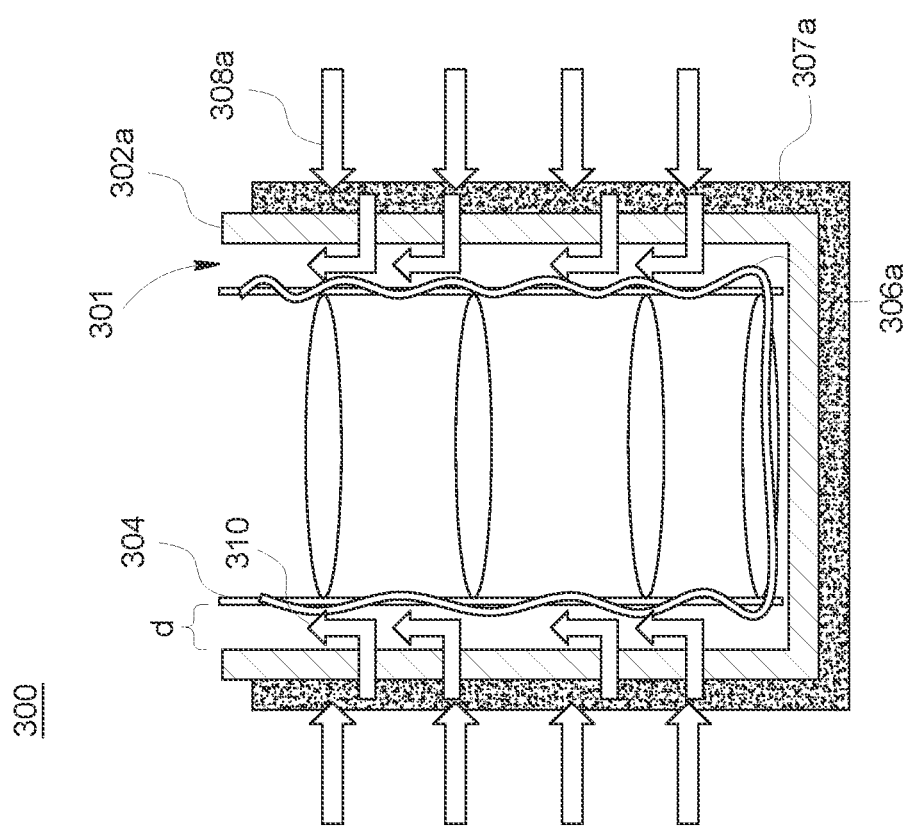
FIG. 3A is a schematic cross-sectional view of a filter assembly for use in a pulse-jet baghouse when exposed to a first fluid stream, in according to embodiments disclosed herein.
Figure 3B:
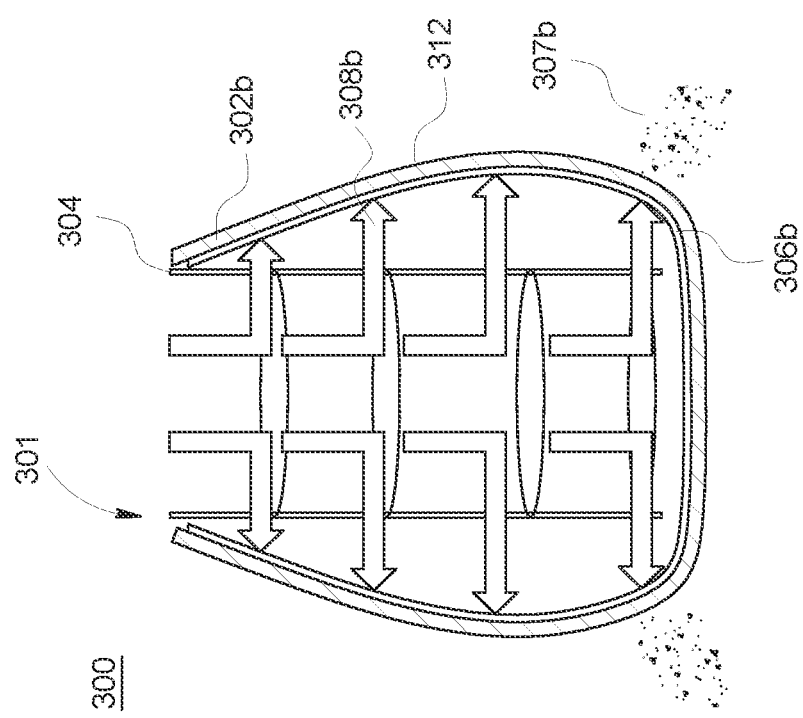
FIG. 3B is a schematic cross-sectional view of a filter assembly for use in a pulse-jet baghouse when exposed to a second fluid stream, in according to embodiments disclosed herein.

FIGS. 3A-3B are schematic diagrams of a filter assembly 300 in normal and opposite flow for use in a pulse-jet baghouse, according to embodiments disclosed herein. As shown, the filter assembly 300 may include a filter component 302a and a flow control component 306a. The filter component 302a may include a filter media and optionally a porous membrane (not shown) attached to the filter media. The filter assembly 300 may also include a support structure 304. The filter assembly 300 may be used for filtering particulates 307a from a fluid stream 308.

The filter assembly 300 further includes a flow control component 306a. The flow control component 306a may be capable of withstanding structural failures caused by stresses of a propagating cleaning pulse that causes the flow control component to engage in an expanding and masking motion against the surface of the filter component 302a. In some embodiments, the flow control component 306a may include a sheet-like material. In certain embodiments, the sheet-like material may be non-porous. In some embodiments, the sheet-like material may be air-impermeable. In certain embodiments, the non-porous sheet-like material may be air-impermeable. In some embodiments, the sheet-like material may include a metal (e.g., aluminum, stainless steel, and copper), or a polymeric non-porous membrane.

In some embodiments, the flow control component 306a is a tube-shaped component with one end closed and the opposite end open. The flow control component 306a can be placed over the support structure 304. The filter component 302a can then be placed over the flow control component 306a so that the support structure 304 is the innermost element and the flow control component 306a is in between the support structure 304 and the filter component 302a. The flow control component 306a can be a relatively looser fitting component, when compared to the filter component 302a. In this way, the flow control component 306a, when operating in the first or normal direction allows at least a portion of the first fluid stream 308a to pass and flow between the flow control component 306a and the filter component 302a. Also, when subject to the first fluid stream, the flow control component may be 'pushed' or 'bowed' into spaces between the support elements of the support structure 304, due to the pressure exerted by the first fluid stream 308a, thereby forming a space 301 between the flow control component 306a and the filter component 302a. The space 301 can be a distance d that is variable depending on, for example, the incoming pressure of the fluid stream 308a, the relative looseness of the flow control component 306a compared to the filter component 302a and flexibility of the flow control component 306a.

During normal flow, as indicated by arrows in FIG. 3A, fluid stream 308a flows in a first direction (e.g., normal direction) through the filter component 302a and then travels in a space or distance 301 between the filter component 302a and the flow control component 306a. As shown in FIG. 3A, dust cakes, i.e., particulates 307a may accumulate on the filter component 302a as particles or particular matter from the fluid stream get collected by the filter component 302a. The space 301 is formed by the distance d between the flow control component 306a and the filter component 302a. In embodiments wherein the flow control component 306a comprises an air impermeable and/or non-porous sheet-like material, the fluid stream 308a is flowing through the filter component 302a and does not go through the flow control component 306a. The cleaned fluid stream 310 is flowing along the space 301 in longitudinal direction.

During reverse flow or pulse jet cleaning pulses, as indicated by arrows in FIG. 3B, a second fluid stream 308b flows in a second direction opposite to the normal direction as shown in FIG. 3A. In embodiments wherein the flow control component 306b includes an air impermeable and/or non-porous sheet-like material, the fluid stream 308b does not penetrate the flow control component 306b. As such, the second fluid stream 308b induces an expanding and masking motion of the flow control component 306b, causing a pressure pulse towards the filter component 302b to release the collected particulates 307b from an upstream surface 312 of the filter component 302b, thus cleaning off the upstream surface 312 of the filter component.

In some embodiments, the filter assembly 300 having the flow control component 306 is capable of having a direction-dependent flow resistance having a first flow resistance in a first direction and a second flow resistance in a second direction when exposed to a fluid stream. The first direction (e.g., normal direction) may be during filtration when the fluid is in normal flow (first fluid flow), whereas the second direction may be during reverse flow or pulse jet cleaning pulses (second fluid flow), and is opposite to the first direction.

Figure 4A:
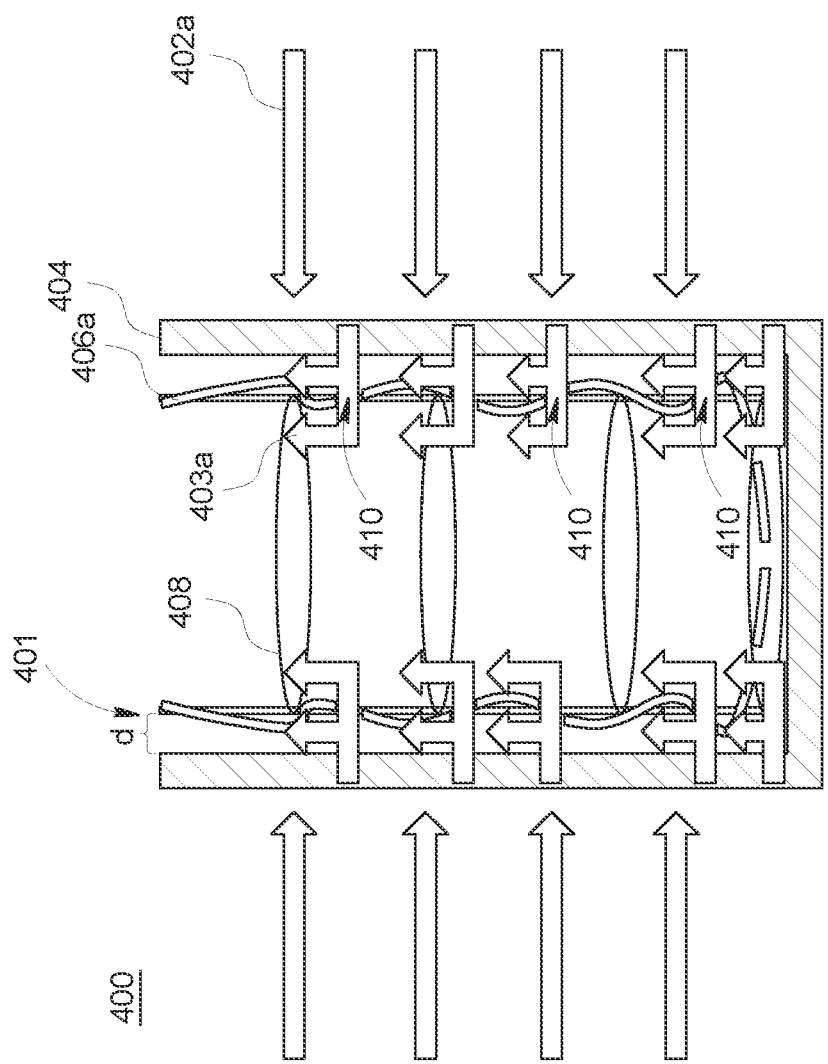
FIG. 4A is a schematic cross-sectional view along the length of a filter assembly for use in a pulse-jet baghouse, according to embodiments disclosed herein.
Figure 4D:
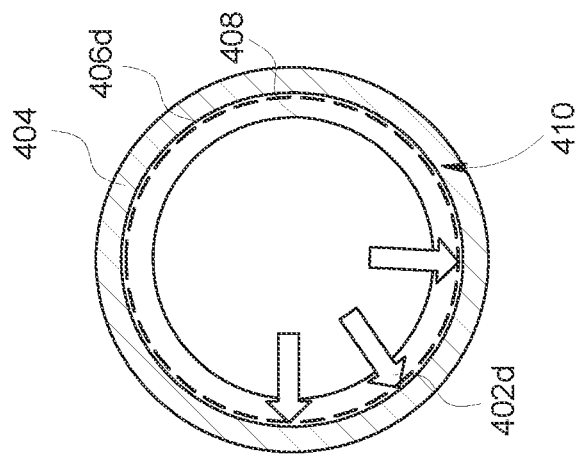
FIGS. 4B-4D are schematic horizontal cross-sectional views of a filter assembly in normal and opposite flow for use in a pulse-jet baghouse, according to embodiments disclosed herein.
Figure 4C:
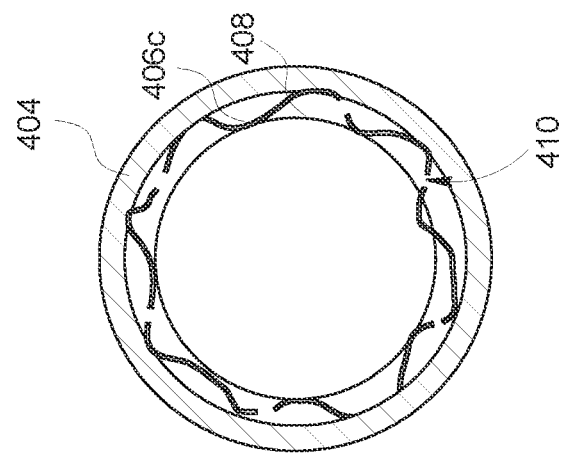
Figure 4B:
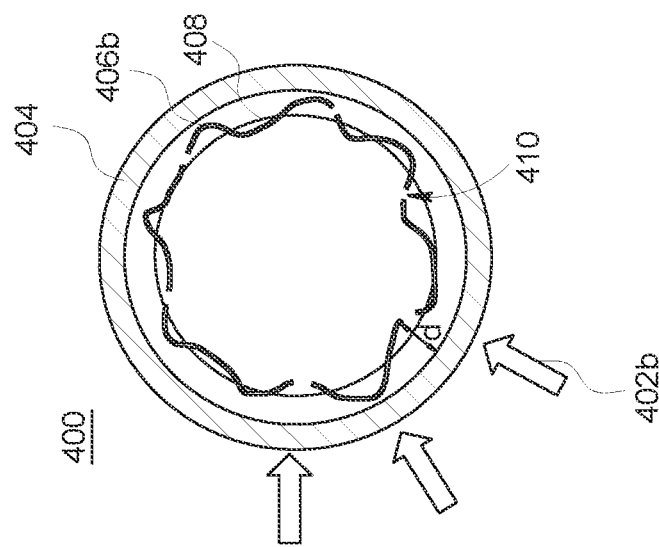

FIG. 4A is a schematic cross-sectional view along the length of a filter assembly 400 for use in a pulse-jet baghouse, according to embodiments disclosed herein. FIGS. 4B-4D are schematic horizontal cross-sectional views of a filter assembly in normal and opposite fluid flow for use in a pulse-jet baghouse, according to embodiments disclosed herein. The filter assembly 400 may be used for filtering particulates from a fluid stream, and may be cleanable (e.g., reverse air, shaker, and pulse-jet).

FIG. 4A shows a cross-sectional view of a filter assembly 400 having a filter component 404, a support structure 408, and a flow control component 406a disposed downstream of the filter component 404, and between the filter component 404 and the support structure 408. The filter component 404 having a filter media and optionally a porous membrane (not shown) attached to the filter media. The flow control component 406a includes several flow control passages or openings 410 which are distributed along the sides and, optionally, at the bottom of the flow control component material. In some embodiments, the filter assembly 400, having the flow control component 406a, is capable of having a direction-dependent flow resistance having a first flow resistance in a first direction and a second flow resistance in a second direction when exposed to a fluid stream. The first direction may be during filtration when the fluid stream 402a is in normal flow.

In some embodiments, the flow control component 406a comprises one or more flow control passages or openings 410 and is a tube-shaped component with one end closed and the opposite end open. The flow control component 406a can be placed over the support structure 408. The filter component 404 can then be placed over the flow control component 406a so that the support structure 408 is the innermost element and the flow control component 406a is in between the support structure 408 and the filter component 404. The flow control component 406a can be a relatively looser fitting component, when compared to the filter component 404. In this way, the flow control component 406a, when operating in the first or normal direction allows at least a portion of the first fluid stream 402a to pass and flow between the flow control component 406a and the filter component 404. A separate portion of the cleaned fluid stream 403a can pass through the one or more flow control passages or openings 410 of the flow control component 406a. When subjected to the first fluid stream 402a, the flow control component may be 'pushed' or 'bowed' into spaces between support elements of the support structure 408, due to the pressure exerted by the first fluid stream 402a, thereby forming a space 401 between the flow control component 406a and the filter component 404. The space 401 can be a distance d that is variable depending on, for example, the incoming pressure of the fluid stream 402a, the relative looseness of the flow control component 406a compared to the filter component 404 and flexibility of the flow control component 406a.

During normal flow, as indicated by arrows in FIG. 4A, at least a portion of fluid stream 402a flows through the filter component 404 and then at least a portion travels through a space or distance 401 between the filter component 404 and the flow control component 406a, then finally through the flow control component 406a. The space 401 is formed by the distance d between the flow control component 406a and the filter component 404. As the flow control component 406a includes several openings 410, another portion of the fluid stream 402a flows through the openings 410 and through the flow control component 406a. Thus, the cleaned fluid stream 403a is partially flowing along the space 401, and partially flowing along the space inside the flow control component 406a and the support structure 408 in a longitudinal direction.

The flow control component 406a may be capable of withstanding structural failures caused by stresses of a propagating cleaning pulse that causes the flow control component 406a to engage in an expanding and masking motion against the surface of the filter component 404. The expanding and masking motion of the flow control component 406a causes a pressure pulse towards the filter component 404 to release the collected particulates from an upstream surface of the filter component 404, thus cleaning off the upstream surface of the filter component. In other words, the flow control component 406a manages the pressure stress of the cleaning pulse while the filter component 404 expands to release the collected particulates.

Referring now to FIGS. 4B-4D, in some instances, the filter component 404 at least partially surrounds the support structure 408. In some embodiments, as shown in FIGS. 4B-4D, the flow control component 406 may include at least one flow control passage or opening 410. The flow control component 406 may be capable of modulating an amount of fluid stream flowing through the filter component 404 by altering a surface area of the filter component 404 exposed to the fluid stream based on a direction of the fluid stream. In some instances, for example as shown in FIGS. 4A-4D, the at least one flow control passage or opening 410 may include openings such as holes, slits, perforations, flaps, or combinations thereof.

In some embodiments, the flow control component 406 may be a membrane including one or more holes, slits, perforations, flaps, or a combination thereof. In other embodiments, the flow control component 406 may include a sheet-like metal material with one or more holes, slits, perforations, flaps, or a combination thereof. In still further embodiments, the flow control component may be a combination of a membrane with one or more metal reinforcing materials and further including one or more holes, slits, perforations, flaps, or a combination thereof. The flow control component 406 a-d may be fitted such that it lies in between the support structure 408 and the filter component 404. In other embodiments, the flow control component may be fitted on an inner side of the support structure 408, that is, on the side of the support structure 408 non-adjacent the filter component 404.

In some embodiments, for example as shown in FIGS. 4A-4C, the fluid stream 402a-b is in a first direction (e.g., normal direction), the flow control component 406a-c is in a slack state, and the outer surface of the flow control component 406a-c has from 0% to 99% contact with the inner surface of the filter component 404. In some embodiments, the contact between the flow control component 406a-c and the filter component 404 may be in a range of from about 0% to about 90%, or from about 0% to about 80%, or from about 0% to about 70%, or from about 0% to about 60%, or from about 0% to about 50%, or from about 0% to about 40%, or from about 0% to about 30%, or from about 0% to about 20%, or from about 0% to about 10%, or the contact may be in a range encompassed within these ranges.

In certain embodiments, the flow control component 406 may contact the filter component 404 by being adhered to the filter component 404. In some embodiments, the flow control component 406 may be attached or adhered (e.g., by welding or using stitches or dots of adhesives or lines of adhesives) to the filter component 404. In some embodiments, the flow control component 406 may cover at least a majority of the filter component 404.

The slack state may also be referred to as a "non-masking" state, as the flow control component 406a-c is not covering/masking, or only covering a part of the inner surface area of the filter component 404. In some embodiments, in the non-masking or slack state, the flow control component 406a and the filter component 404 can be in contact with each other at areas that correspond to elements of the support structure 408, i.e., the support structure 408 provides a friction fit for the flow control component 406a and the filter component 404 and therefore provide a relatively tight fit between the support structure 408, the flow control component 406a and the filter component 404. At areas where the support structure 408 does not directly contact the flow control component 406a, portions of the flow control component 406a may be in direct contact with the filter component 404 and portions of the flow control component 406a may be separated from the filter component 404 by a space 401 and a distance d, or both.

In the slack state, for example, the distance d between a point on the outer surface of the flow control component and the inner surface of the filter component may be anywhere in the range of 0.0 to about 100 mm, or from about 0.001 to about 100 mm, or from about 0.002 to about 95 mm, or from about 0.003 to about 90 mm, or from about 0.004 to about 85 mm, or from about 0.005 to about 80 mm, or from about 0.006 to about 75 mm, or from about 0.007 to about 70 mm, or from about 0.008 to about 65 mm, or from about 0.009 to about 60 mm, or from about 0.01 to about 55 mm.

In some embodiments, for example as shown in FIG. 4C, the fluid stream may be in the process of changing directions, the flow control component 406c may remain in a slack state, and at least a portion of the flow control component 406c may contact the inner surface of the filter component 404. Although a portion of the flow control component 406c may contact the filter component 404 when in a slack state, there is no pressure between the flow control component 406c and the filter component 404 in the slack state.

In some embodiments, for example as shown in FIG. 4D, the fluid stream 402d is in a second direction (e.g., opposite direction to normal direction), the flow control component 406d is in an expanded state, and the outer surface of the flow control component 406d is in contact with an inner surface of the filter component 404. The second direction of the second fluid stream 402d may be opposite to the first direction of the first fluid stream 402a-b. In some embodiments, the fluid stream 402d is a reverse air stream, and may be the same or different as fluid streams 402a-c. In some embodiments, the fluid stream 402d may be a pulse-jet air stream, and may be different from the fluid streams 402a-c. In some embodiments, the fluid stream 402d is a filtered stream that is different in composition from the fluid streams 402a-c, which are not filtered and thus have more particulates. In some embodiments, the fluid stream 402d is different (e.g., opposite) in direction from the fluid streams 402a-c.

The expanded state may also be referred to as the "masking" state, as the flow control component 406d is masking or covering at least a portion of the inner surface area of the filter component 404 that is exposed to the fluid stream 402d. The flow control component 406 is capable of alternating between the slack, non-masking state and an expanded, masking state relative to the filter component 404.

In some embodiments, the filter assembly having the flow control component 406 may be capable of having a direction-dependent flow resistance having a first flow resistance in a first direction and a second flow resistance in a second direction when exposed to a fluid stream. As the average size or number of the flow control passages or openings 410 decreases, the difference between the first flow resistance and the second flow resistance increases, the second flow resistance being greater than the first flow resistance. The increase in difference between the first flow resistance and the second flow resistance is a result of the flow control component masking a larger area of an inner surface of the filter component, thus decreasing the surface area of the filter component 404 that is exposed to the fluid stream.

In some instances, a ratio of the first flow resistance to the second flow resistance ranges from less than 0.01% to about 99%, or from about 0.1% to about 99%, or from about 0.5% to about 99%, or from about 1% to about 99%, or from about 2% to about 95%, or from about 3% to about 90%, or from about 4% to about 85%, or from about 5% to about 80%, or from about 6% to about 75%, or from about 7% to about 70%, or from about 8% to about 65%, or from about 9% to about 60%, or from about 10% to about 55%, or from less than 0.01% to about 50%, or from about 0.1% to about 50%, or from about 0.5% to about 50%.

In embodiments, the flow control passages 410 may have openings with an average opening size from about 0.0001 to about 100,000 mm$^2$, or from about 0.001 to about 80,000 mm$^2$, from about 0.01 to about 60,000 mm$^2$, from about 0.1 to about 40,000 mm$^2$, from about 1 to about 30,000 mm$^2$, from about 2 to about 20,000 mm$^2$, from about 3 to about 10,000 mm$^2$, from about 4 to about 8,000 mm$^2$, from about 5 to about 6,000 mm$^2$, from about 6 to about 4,000 mm$^2$, from about 7 to about 2,000 mm$^2$, from about 8 to about 1,000 mm$^2$, from about 9 to about 500 mm$^2$, from about 10 to about 200 mm$^2$, or may have openings with an average opening size encompassed within these ranges.

In embodiments, the flow control passages 410 may have slits having a length of from greater than 0 to about 10 m, or from about 0.1 to about 9.5 m, or from about 0.2 to about 9.0 m, or from about 0.3 to about 8.5 m, or from about 0.4 to about 8.0 m, or from about 0.5 to about 7.5 m, or from about 0.6 to about 7.0 m, or from about 0.7 to about 6.5 m, or from about 0.8 to about 6.0 m, or from about 0.9 to about 5.5 m, or from about 1.0 to about 5.0 m.

In some instances, a fluid stream passing through the flow control component in the first direction at a first velocity of greater than 0.001 m/s experiences a first flow resistance of less than about 33 min/m, or less than about 30 min/m, or less than about 27 min/m, or less than about 24 min/m, or less than about 21 min/m, or less than about 18 min/m, or less than about 15 min/m, or less than about 12 min/m, or less than about 9 min/m, or less than about 6 min/m.

In some instances, the fluid stream passing through the flow control component in the second direction at a second velocity of less than 0.05 m/s experiences a second flow resistance of more than about 0.08 min/m, or more than about 0.09 min/m, or more than about 0.1 min/m, or more than about 0.11 min/m, or more than about 0.12 min/m, or more than about 0.13 min/m, or more than about 0.14 min/m, or more than about 0.15 min/m, or more than about 0.16 min/m, or more than about 0.17 min/m.

Figures 5A, 5B:
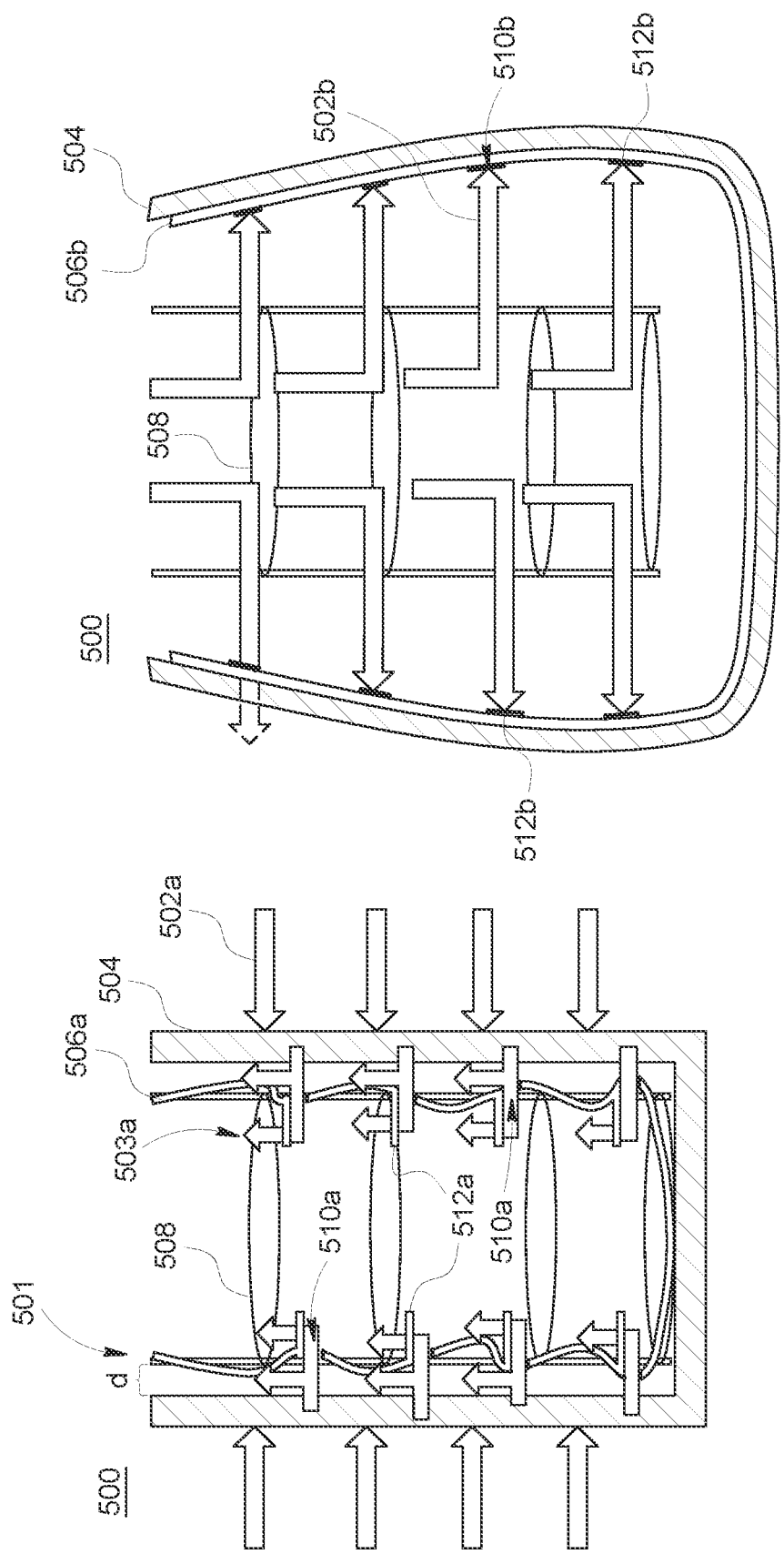
FIGS. 5A-5B are schematic cross-sectional views along the length of a filter assembly in normal and opposite flow for use in a pulse-jet baghouse, according to embodiments disclosed herein.
Figure 5D:
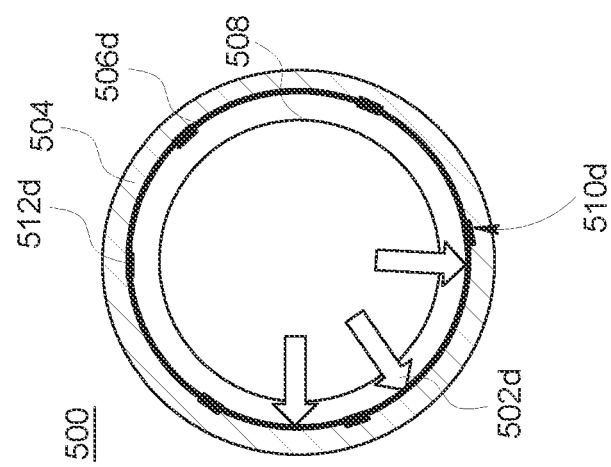
FIGS. 5C-5D are schematic horizontal cross-sectional views of a filter assembly in normal and opposite flow for use in a pulse-jet baghouse, according to embodiments disclosed herein.
Figure 5C:
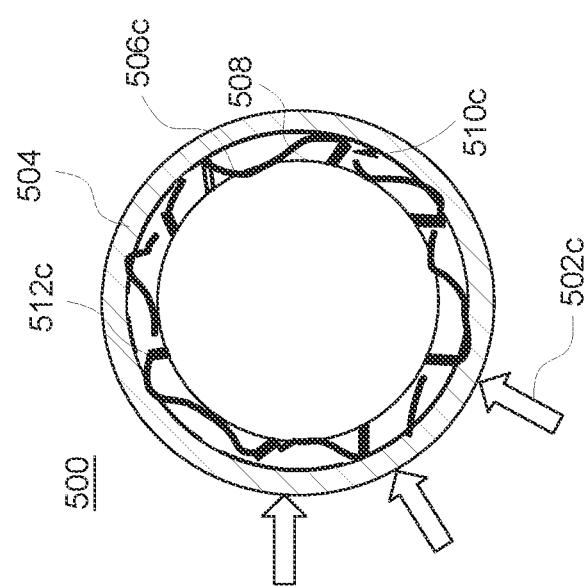

FIGS. 5A-5B are schematic cross-sectional views along the length of a filter assembly 500 in normal and opposite flow for use in a pulse-jet baghouse, according to embodiments disclosed herein. FIGS. 5C-5D are schematic horizontal cross-sectional views of a filter assembly 500 in normal and opposite flow for use in a pulse-jet baghouse, according to embodiments disclosed herein. The filter assembly 500 may be used for filtering particulates from a fluid stream 502.

In some embodiments, the filter assembly 500 may include a filter component 504, a support structure 508, and a flow control component 506a disposed between the filter component 504 and the support structure 508. In some instances, the filter component 504 at least partially surrounds the support structure 508. In some embodiments, for example as shown in FIGS. 5C-5D, at least a portion of the outer surface of the flow control component 506 is in contact with the inner surface of the filter component 504. The flow control component 506 may include at least one flow control passage 510. In some embodiments, the flow control component 506 may include a plurality of flow control passages 510. The plurality of flow control passages 510 may be selected from openings such as holes, slits, flaps or combinations thereof. The openings may be of a variety of geometric shapes (e.g., circle, oval, triangle, or rectangle).

In some embodiments, the flow control component 506a comprises one or more flow control passages 510a, one or more flaps 512a and the flow control component 506a is a tube-shaped component with one end closed and the opposite end open. The flow control component 506a can be placed over the support structure 508. The filter component 504 can then be placed over the flow control component 506a so that the support structure 408 is the innermost element and the flow control component 506a is in between the support structure 508 and the filter component 504. The flow control component 506a can be a relatively looser fitting component, when compared to the filter component 504. In this way, the flow control component 506a, when operating in the first or normal direction allows at least a portion of the first fluid stream 502a to pass and flow between the flow control component 506a and the filter component 504. A separate portion of the first fluid stream 502a can pass through the one or more flow control passages or openings 510a, opening the one or more flaps 512a to an open position of the flow control component 506a. When subjected to the first fluid stream 502a, the flow control component may be 'pushed' or 'bowed' into spaces between support elements of the support structure 508, due to the pressure exerted by the first fluid stream 502a, thereby forming a space 501 between the flow control component 506a and the filter component 504. The space 501 can be a distance d that is variable depending on, for example, the incoming pressure of the fluid stream 502a, the relative looseness of the flow control component 506a compared to the filter component 504 and flexibility of the flow control component 506a. In FIG. 5B, the flow control component 506b, when operating in the opposite direction is subject to a second fluid stream 502b, the one or more flaps 512b are pushed to a closed positions (e.g., shown as closed flow control passages 510b), limiting the amount of the second fluid stream 502b that can flow through the one or more flow control passages or openings 510.

In some embodiments, for example as shown in FIGS. 5A-5D, the flow control passage 510 may include one or more flaps 512. The flow control component 506 may have a percentage open area of from about 0.01% to about 50%, or from about 0.02% to about 48%, from about 0.03% to about 46%, from about 0.04% to about 44%, from about 0.05% to about 42%, from about 0.06% to about 40%, from about 0.07% to about 38%, from about 0.08% to about 36%, from about 0.09% to about 34%, from about 0.10% to about 32%, from about 0.11% to about 30%, from about 0.12% to about 28% compared to the total area of the flow control component. The percentage open area as used herein is determined by the percentage open area of the flow control component. The percent open area can be determined by determining the total open area of the openings of the flow control component divided by the total area of the flow control component. If one or more of the openings are in the form of a flap, then the area of each opening is determined as if the material of each flap was not present.

In some embodiments, when the flow control component has a percentage open area of from 0.01% to 50% compared to the total surface area of the flow control component, the surface area of the filter component exposed to the second fluid stream is decreased by 50% to 100% or from 50% to 99.99%. In some embodiments, as the percentage open area of the flow control component decreases, the difference between the first flow resistance and the second flow resistance increases. In other words, the smaller the percentage open area is on the flow control component, the larger the difference is between the first flow resistance and the second flow resistance.

In certain embodiments, the flow control component 506 may be located in an inner area of the filter component 504 (e.g., downstream of the first fluid stream). In some embodiments, the flow control component 506 may decrease the overall flow through the filter component 504 in the second direction 502d by more than 50% compared to a filter component without the flow control component. In some embodiments, the flow control component 506 may decrease the overall flow through the filter component 504 in the second direction 502d by more than 55%, or more than 60%, or more than 70%, or more than 80% or more than 90%, or more than 95%, or more than 99% compared to a filter component without the flow control component.

An distance (d) between a point on the outer surface of the flow control component 506 and the inner surface of the filter component 504 is from about 0 to about 100 mm, or from about 0.001 to about 90 mm, or from about 0.005 to about 80 mm, or from about 0.01 to about 70 mm, or from about 0.1 to about 60 mm, or from about 0.2 to about 50 mm, or from about 0.5 to about 40 mm, or from about 1.0 to about 30 mm, or from about 2.0 to about 20 mm, or from about 3.0 to about 10 mm, or may be a distance encompassed within these ranges.

The flow control component 506 may mask or cover the inner surface of the filter component 504 to decrease a surface area of the filter component that is exposed to the second fluid stream by about 10 to about 100%, or by about 12 to about 98%, or by about 14 to about 96%, or by about 16 to about 94%, or by about 18 to about 92%, or by about 20 to about 90%, or by about 22 to about 88%, or by about 24 to about 86%, or by about 26 to about 84%, or by about 28 to about 82%, or may decrease the surface area of the filter component exposed to the second fluid stream by a percentage encompassed within these ranges, when compared to a filter component without the flow control component.

In some embodiments, for example as shown in FIG. 5A or 5C, the fluid stream 502a or 502c is in a first direction (e.g., normal direction), and the flow control component 506a or 506c with one or more flaps 512 is in a slack and open state, where the one or more flaps 512 do not cover the plurality of flow control passages 510a or 510c. The fluid stream 502a or 502c passing through the flow control passage 510a or 510c at a first rate experiences a first flow resistance. In some embodiments, the first fluid stream flows through the filter assembly at a rate in the range of from 0.1 meters/minute (m/min) to 5 m/min. In other embodiments, the first fluid stream flows through the filter assembly at a rate in the range of from 0.2 m/min to 4 m/min, or from 0.25 m/min to 3.5 m/min, or from 0.25 m/min to 3 m/min, or from 0.3 m/min to 3 m/min, or from 0.3 m/min to 2.5 m/min, or from 0.25 m/min to 2.5 m/min, or from 0.25 m/min to 2.4 m/min.

In some embodiments, for example as shown in FIG. 5B or 5D, the fluid stream 502b or 502d is in a second direction (e.g., opposite direction to the normal direction), and the flow control component 506b or 506d is in a masked and closed state, where the one or more flaps 512 cover at least part of the plurality of flow control passages 510b and 510d. In some embodiments, where the flow control component 506 is fluid permeable, the fluid stream 502b or 502d passes through the flow control component 506b or 506d in the second direction at a second flow rate and experiences a second flow resistance, at flow rates that are less than in the first direction. In some embodiments, where the flow control component 506 is fluid impermeable, the fluid stream 502b or 502d does not pass through the flow control passages 510b or 510d, as the flow control component 506b and are in a closed state when the fluid stream is flowing in the second direction.

In some embodiments, the first flow resistance is different from the second flow resistance. In an exemplary embodiment, the first flow resistance is smaller than the second flow resistance.

Figure 9A:
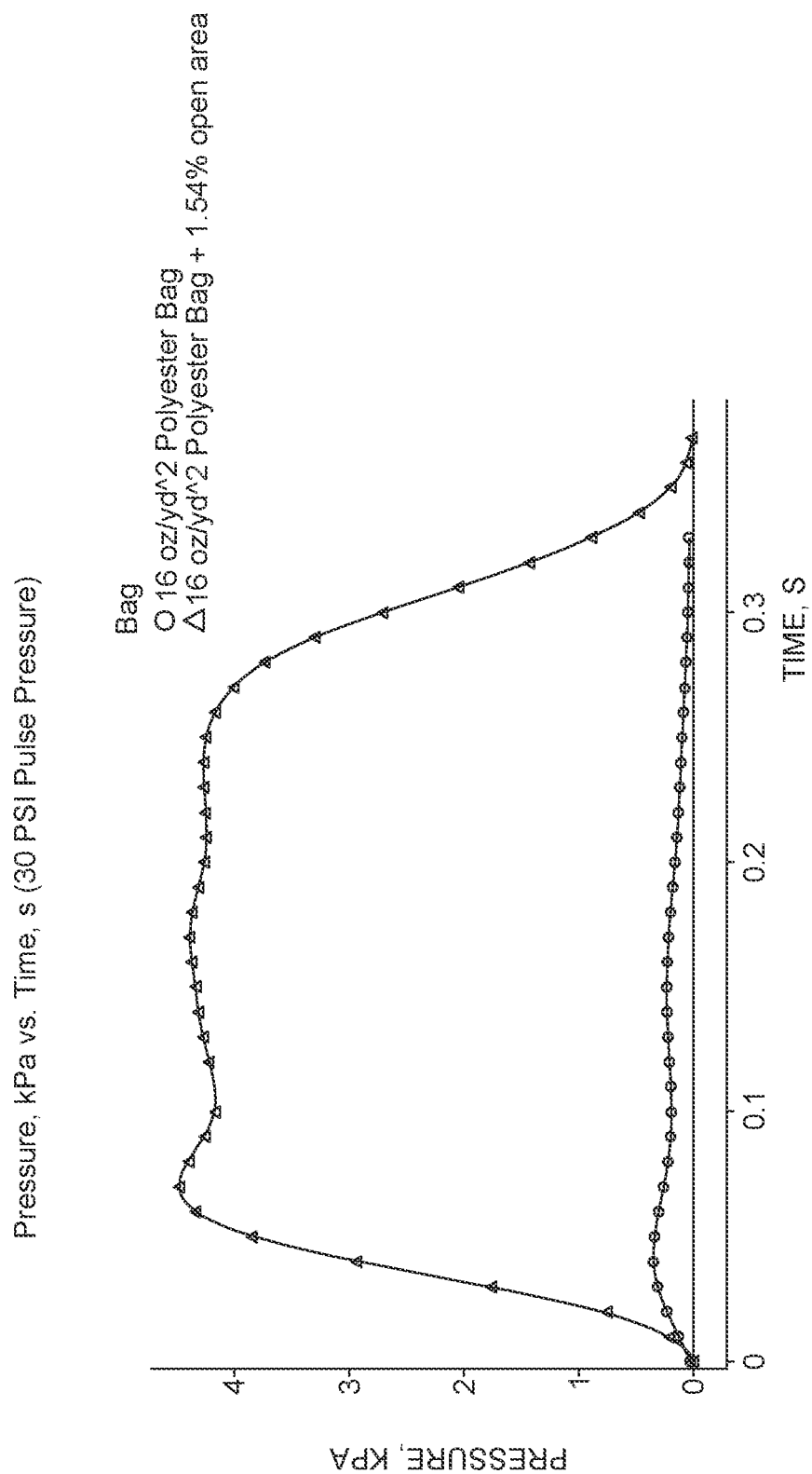
FIGS. 9A-C are line graphs showing comparisons between pressure (KPa) versus time measured at one location in a filter assembly according to prior art versus a filter assembly according to embodiments disclosed herein.
Figure 9B:
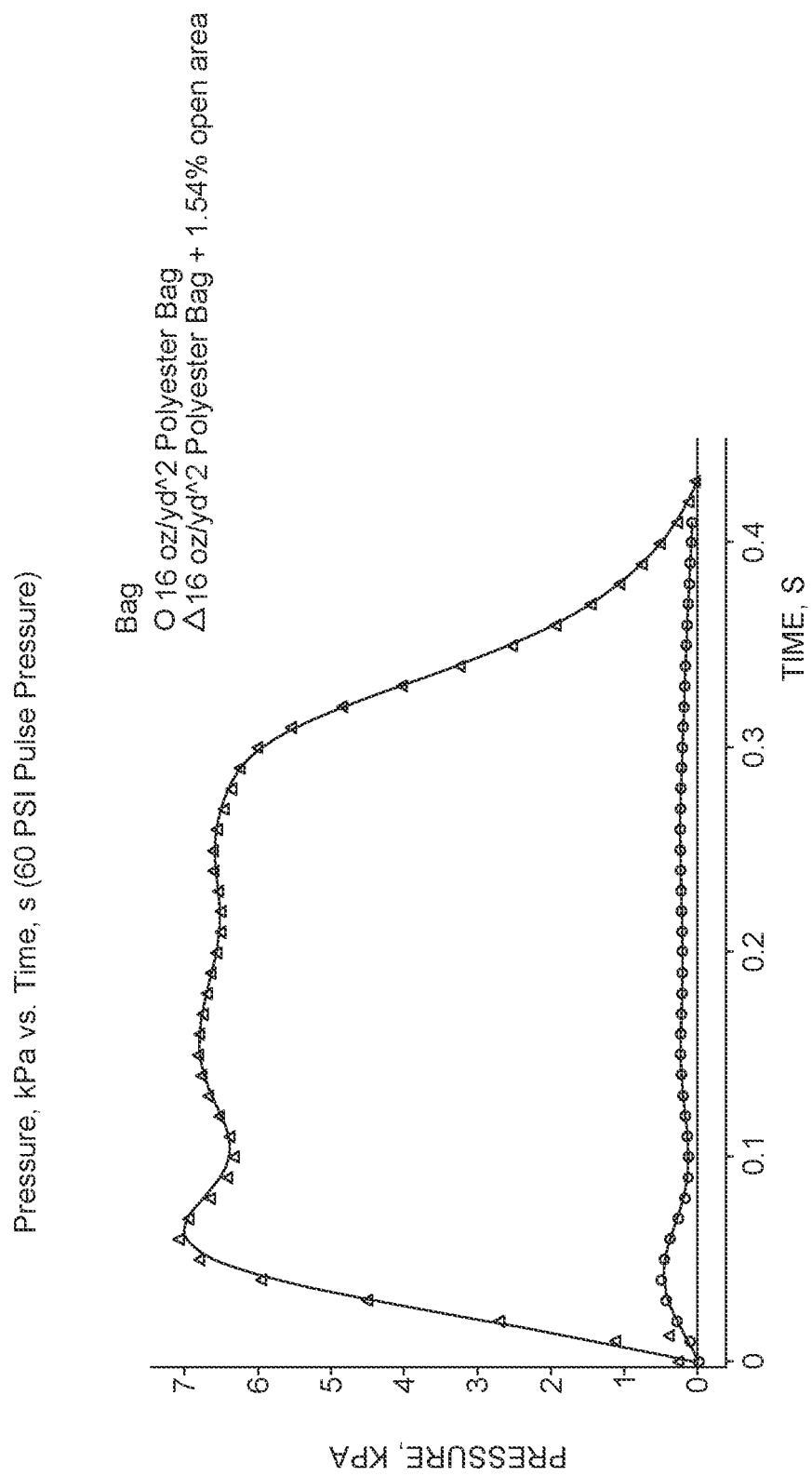
Figure 9C:
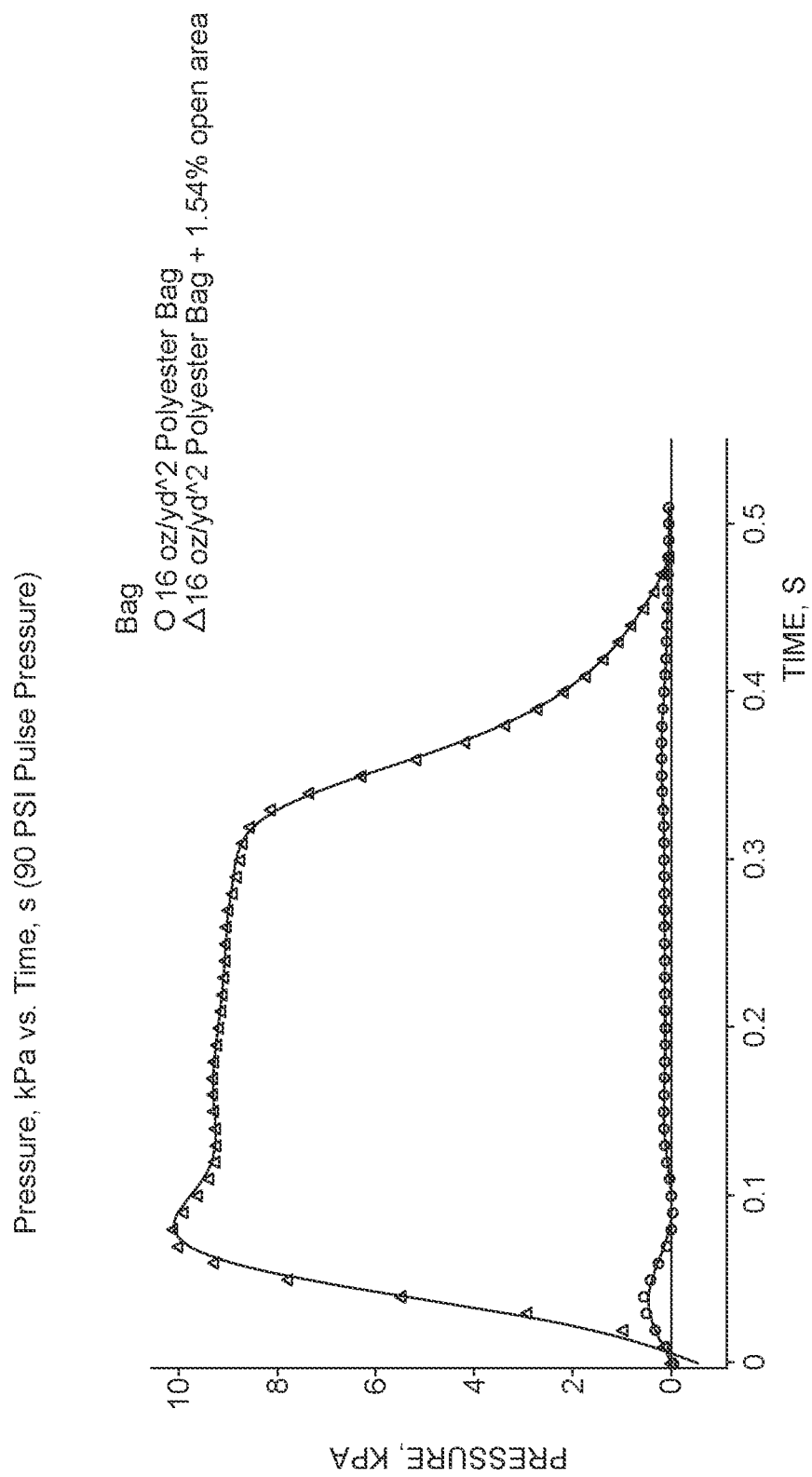
Figure 10:
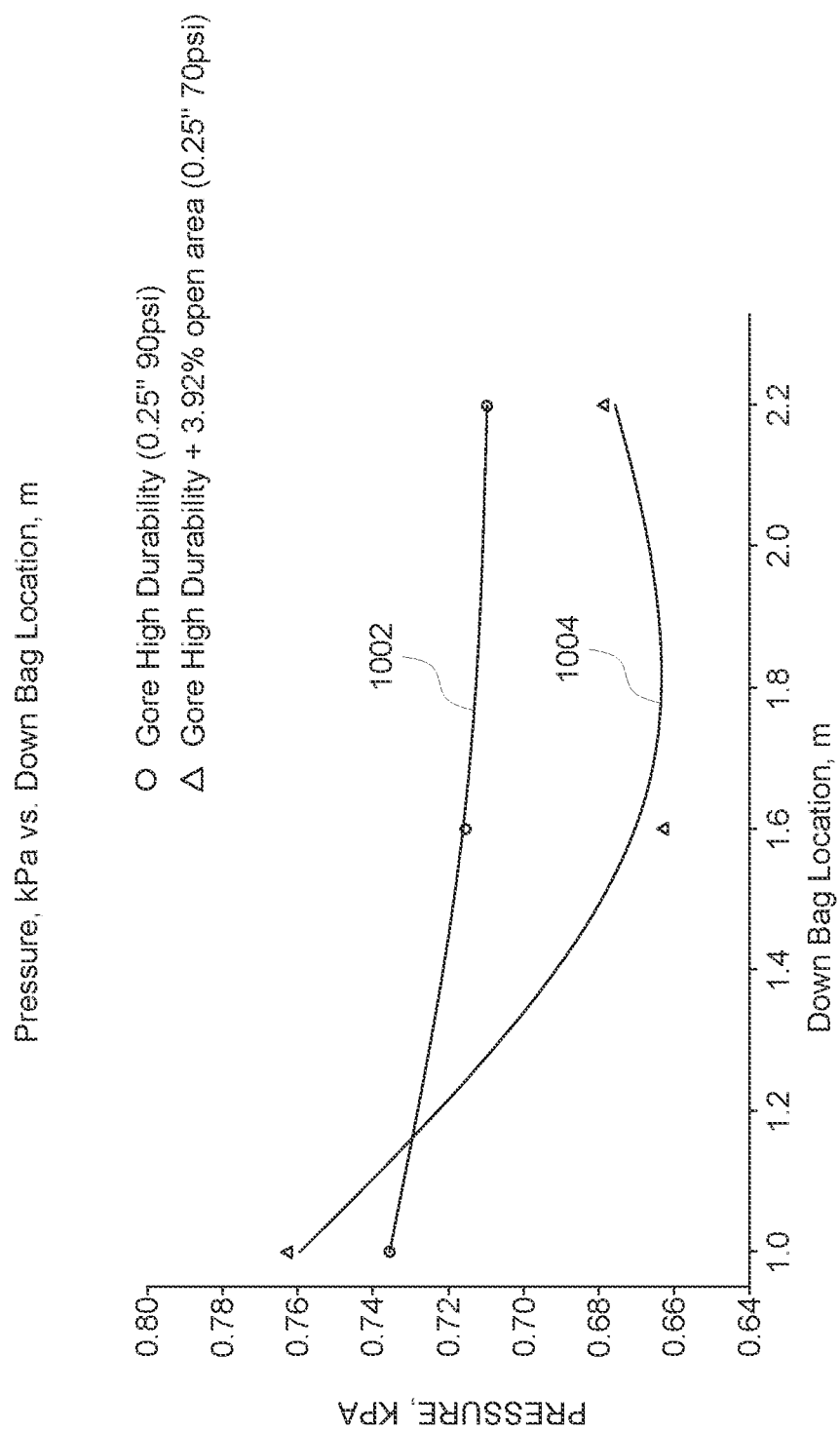
FIG. 10 is a line graph showing a comparison between pressure (KPa) measured at various locations in a filter assembly according to prior art versus a filter assembly according to embodiments disclosed herein.

Filter assemblies comprising a flow control component according to FIGS. 3-5 are capable of modulating the amount of the second fluid stream flowing through the filter component by altering the surface area of the filter component that is exposed to the second fluid stream. In some embodiments, when the filter assembly is exposed to the second fluid stream in the second direction, the pressure inside the filter assembly is increased compared to the same second fluid stream without the flow control component. In further embodiments, when the filter assembly is exposed to the second fluid stream in the second direction, the flow control component is capable of reducing the flow of the second fluid stream flowing through the filter assembly and thereby increasing a pressure inside the filter assembly. As used herein, the phrase "inside the filter assembly" means the downstream side of the filter assembly when the fluid stream is in the first direction. Also, the increase in pressure inside the filter assembly is relative to the same filter assembly under the same second fluid stream pressure when the filter assembly does not contain the flow control component. As used herein the increase in pressure inside the filter assembly can be measured in one or more ways. For example, at least 3 sensors, spaced relatively evenly along the longitudinal axis of the filter assembly can measure the pressure along the length of the filter assembly. The increase in pressure can be represented as differences in the area under pressure curves (i.e., FIG. 10). In other embodiments, the increase in pressure can be measured at least one pressure measurement along the longitudinal axis of the filter assembly is increased compared to the pressure measurement of the without the flow control component (i.e., FIG. 9A, 9B or 9C). In still further embodiments, the increase in pressure is more uniform compared to the same filter assembly without the flow control component as shown in FIG. 10 when comparing the difference between the pressures at least three points along the longitudinal axis of the filter assembly, i.e., Example 6 versus the comparative example, without a flow control component.

Figure 6B:
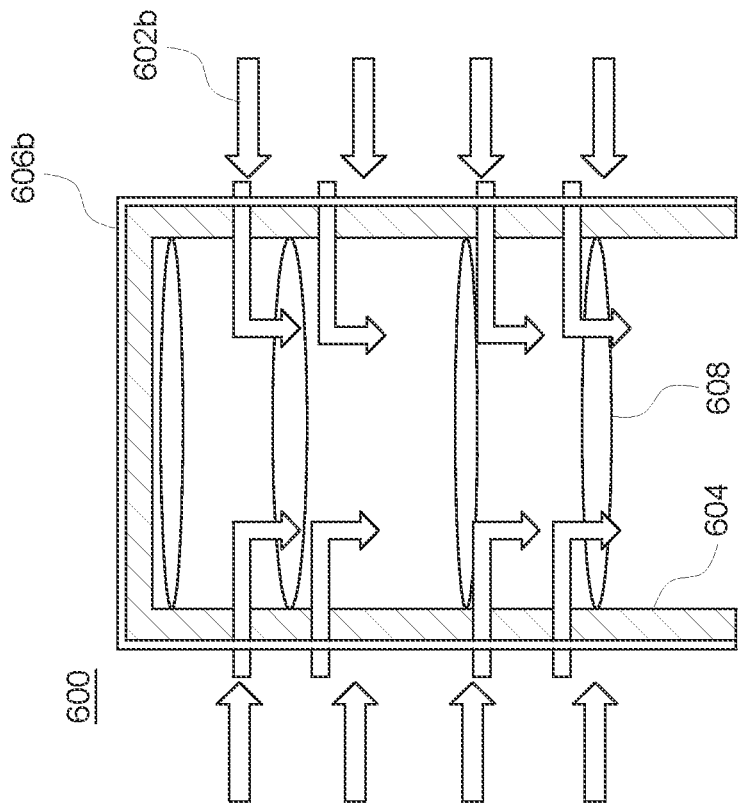
FIGS. 6A-6B are schematic cross-sectional views of a filter assembly in normal and opposite flow for use in a reverse air filter, according to embodiments disclosed herein.
Figure 6A:
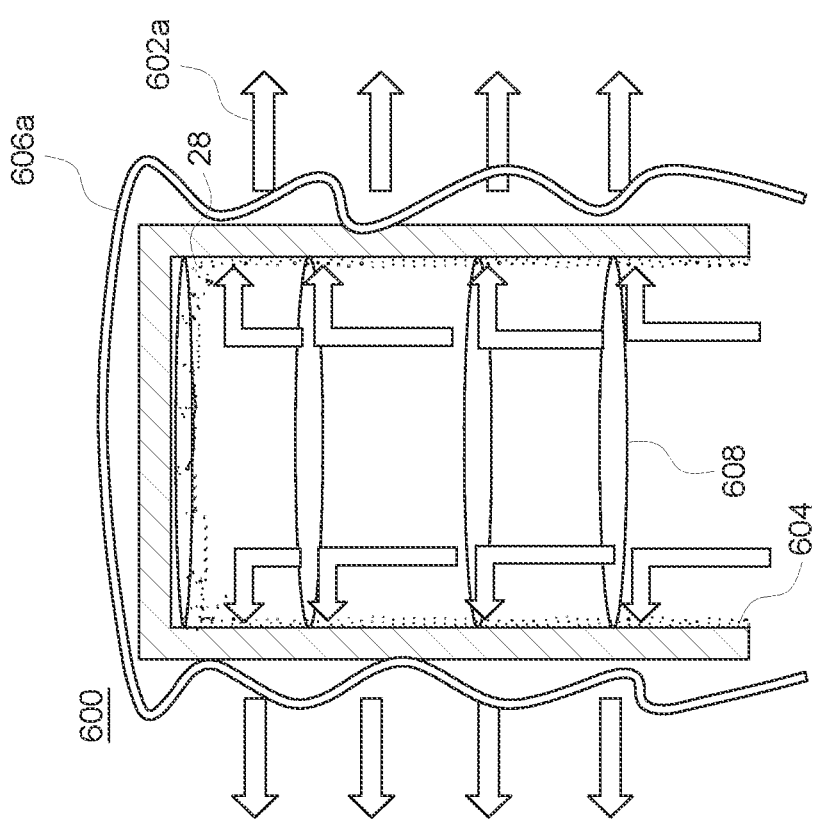

FIGS. 6A-6B are schematic cross-sectional views of an exemplary filter assembly 600 for use in a reverse air filter, according to embodiments of the present disclosure.

The filter assembly 600 may be used for filtering particulates from a fluid stream 602. In some embodiments, the filter assembly 600 may include a filter component 604, a support structure 608, and a flow control component 606 disposed downstream of the filter component 604 in the forward direction, and outside of both the filter component 604 and the support structure 608. The support structure 608 may be a plurality of support rings. The particulates collected from the fluid stream 602 may form a dust cake 28 in the inside of the filter component 604.

In some instances, the filter component 604 at least partially surrounds the support structure 608. In some embodiments, the flow control component 606 may include a flow control passage. The flow control passage may either include openings (see, e.g., FIG. 4), or flaps (see, e.g., FIG. 5).

The present disclosure also relates to a baghouse filter system comprising a housing having an inlet and an outlet, a tube sheet positioned within the housing between the inlet and outlet, and one or more of the filter assemblies described herein.

The present disclosure also relates to a method of cleaning a bag house filter system, comprising providing a cleaning fluid (i.e., the second fluid stream) at a pressure of from 0.20 to 760 kPa through one or more of the filter assemblies described herein mounted to a tube sheet, thereby by causing an expansion of the flow control component, wherein the expansion exerts and dissipates mechanical pressure on the filter component in response to the cleaning pulse, thereby inducing cleaning of the filter component. In some embodiments, a method of cleaning a bag house filter system includes providing a reverse air flow at a pressure of from about 0.20 kPa to about 1 kPa, or from about 0.25 kPa to about 1 kPa, or from about 0.3 kPa to about 1 kPa, or from about 0.4 kPa to about 1 kPa, or from about 0.4 kPa to about 0.9 kPa, or from about 0.25 kPa to about 0.9 kPa, or from about 0.3 kPa to about 0.9 kPa, or from about 0.4 kPa to about 0.9 kPa, or from about 0.4 kPa to about 0.85 kPa through one or more of the filter assemblies (e.g., the filter assemblies described in FIGS. 3-5) mounted to a tube sheet, thereby causing an expansion of the flow control component. In certain embodiments, a method of cleaning a bag house filter system includes providing a second fluid stream that pulses at a pressure of from about 1 to about 760 kPa, or from about 10 to about 760 kPa, or from about 50 to about 760 kPa, or from about 70 to about 750 kPa, or from about 70 to about 700 kPa, or from about 100 to about 700 kPa, or from about 125 to about 700 kPa, or from about 150 to about 700 kPa, or from about 170 to about 700 kPa, or from about 170 to about 650 kPa, or may pulse at a pressure encompassed within these ranges, through one or more of the filter assemblies.

In some embodiments, a tube sheet may include (e.g., the tube sheet in FIG. 1) one or more openings for the one or more filter assemblies to mount to. In some embodiments, a method of cleaning a bag house filter system includes providing a reverse air flow through one or more of the filter assemblies (e.g., the filter assembly described in FIG. 6).

In embodiments, the expansion exerts and dissipates mechanical pressure on the filter component in response to the cleaning pulse, thereby inducing cleaning of the filter component.

Test Methods

It should be understood that although certain methods and equipment are described below, other methods or equipment determined suitable by one of ordinary skill in the art may be alternatively utilized.

Small Sample Measurements

An apparatus as described in the ISO 11057 standard was used for small sample measurements for samples of 140 mm diameter. The apparatus was used for differential pressure measurements and can provide an indication for the pressure generated during a back pulse using the settings as described in the ISO 11057 standard. The pressure was adjusted to ensure a face velocity of 2 m/min for the differential pressure measurement. The air permeability is reported as face velocity per differential pressure in units of m/(min*Pa). The back pulse was set to 0.5 M Pa for a duration of 60 milliseconds. The pressure during the back pulse was measured by an additional pressure transducer, model #MMCG001BIV10K4A0T1A1 (available from Omega Engineering, Norwalk, Connecticut), which is placed immediately downstream of the filter assembly to assess the effectiveness of the back pulse. The pressure transducer had a lower range limit of −7 kPa and an upper range limit of 7 kPa.

Bag House Measurements

Measurements on actual filter assemblies were performed in a laboratory scale baghouse. This baghouse was capable of containing nine bags of 117 mm diameter and 2.4 m length and allowed a total airflow of 85 to 340 m$^3$/hr through the bags. The airflow was measured by a 160S-18PM "S" type pitot tube (available from Dwyer Instruments, Michigan City, Indiana) and the pressure drop was measured by magnehelic pressure transducers (Dwyer Instruments, Michigan City, Indiana) upstream and downstream of the bags for pressure drop measurements. The air permeability is reported as face velocity per differential pressure in units of m/(min*Pa). The baghouse was equipped with a bag pulse system, where three groups of three bags were back pulsed simultaneously. The back pulse was introduced through orifice nozzles of 12.7 mm diameter at the upper opening of the bags. The pressure and duration of the pulse was controlled by a Goyen T-series threaded back pulse control system (Pentair Goyen Mecair, St. Paul, Minnesota). The location of the nozzle was adjusted based on the desired volume of the back pulse flow. One bag was equipped with four additional pressure transducers part number SSCDRRN005PDAA5 (available from Honeywell International, Charlotte, North Carolina) inside the length of the bag as illustrated in FIG. 2A. The location of the pressure sensors was 0.4, 1.0, 1.6, and 2.2 m from the top opening of the bag, respectively. These pressure sensors were used to measure the pressure distribution along the length of the filter assembly. In all experiments, only one filter assembly instead of nine was used in the baghouse to accurately measure the flow and pressures for that particular filter assembly. The data from these measurements was captured using a Dataq Instruments Data Logger model DI-2108.

Flow Resistance

Flow resistance was determined as the inverse of air permeability. The value for the Flow resistance may be calculated using the formula "Flow resistance=1/air permeability" and has units of (min*Pa)/m when the air permeability is measured as provided in the Small Sample Measurements test described above.

Preparation of Polyester Filter Bag

A rectangular portion of a 542 gram s/meter2 (gsm) (16 oz/yd2) polyester felt (part #R4417 PE-16/G-FPES, available from Southern Felt Company, Augusta, South Carolina) was cut to produce a filter bag having a length of 2.5 m and a diameter of about 11.7 centimeters (4.6 inches). The filter bag was produced by sewing the rectangular material into a tube shape. Top and bottom cuffs were sewn onto the tube. A snap band was added to the top cuff to produce the filter bag.

Support Structure

The support structure was a steel wire filter bag cage having a length of 2,438 millimeters (mm) and a diameter width of about 114.3 mm (4.5 inches) that was produced by Royal Wire Products, Inc., Charlotte, North Carolina. Each cage has 16 wires oriented in the lengthwise direction and spaced approximately evenly and 12 wires oriented horizontally and spaced approximately evenly to form the cage. The top of each support structure was a rolled flange that was slightly wider than the width dimensions and was fitted with a venturi. The venturi had dimensions of 13.3 cm×15.2 cm with a minimum throat diameter of 4.52 cm (5.25"×6.00" with a minimum throat diameter 1$^{25}$⁄$_{32}$").

Preparation of Flow Control Component #1

A rectangular section of a perfluoroalkoxy alkane polymer (PFA)/ePTFE composite film having a weight of 50 grams per meter$^2$ (gsm) and a density of 2.0 grams/cubic centimeter$^3$ (g/cc) was cut out to produce a tube having a length of 2.5 m and a diameter of about 119 mm (±3 mm). The rectangular section was about cut to have a width of about 406 mm (±6 mm) and then folded in half lengthwise. The folded over edge was then heat sealed with a seam allowance of about 16 mm (±1 mm). Circular holes having a diameter of 9.5 millimeters (mm) were created by punching the holes using a 9.5 mm die punch at a frequency of about 230 openings/meter$^2$ (about 1.64% open area). The film was heat bonded to produce the tube having a seam running lengthwise. The flow control component was slightly oversized compared to the support structure and the filter bag.

Preparation of Flow Control Component #2

A rectangular section of a PFA/ePTFE composite film having a weight of 50 gsm and a density of 2.0 g/cc was cut out to produce a tube having a length of 2.5 m and a diameter of about 119 mm (±3 mm). The rectangular section was about cut to have a width of about 406 mm (±6 mm) and then folded in half lengthwise. The folded over edge was then heat sealed with a seam allowance of about 16 mm (±1 mm). Circular holes having a diameter of 9.5 millimeters (mm) were created by punching the holes using a 9.5 mm die punch at a frequency of about 216 openings/meter$^2$ (about 1.54% open area). The film was heat bonded to produce the tube having a seam running lengthwise. The flow control component was slightly oversized compared to the support structure and the filter bag.

EXAMPLES

Example 1 (Comparative)

Figure 7:
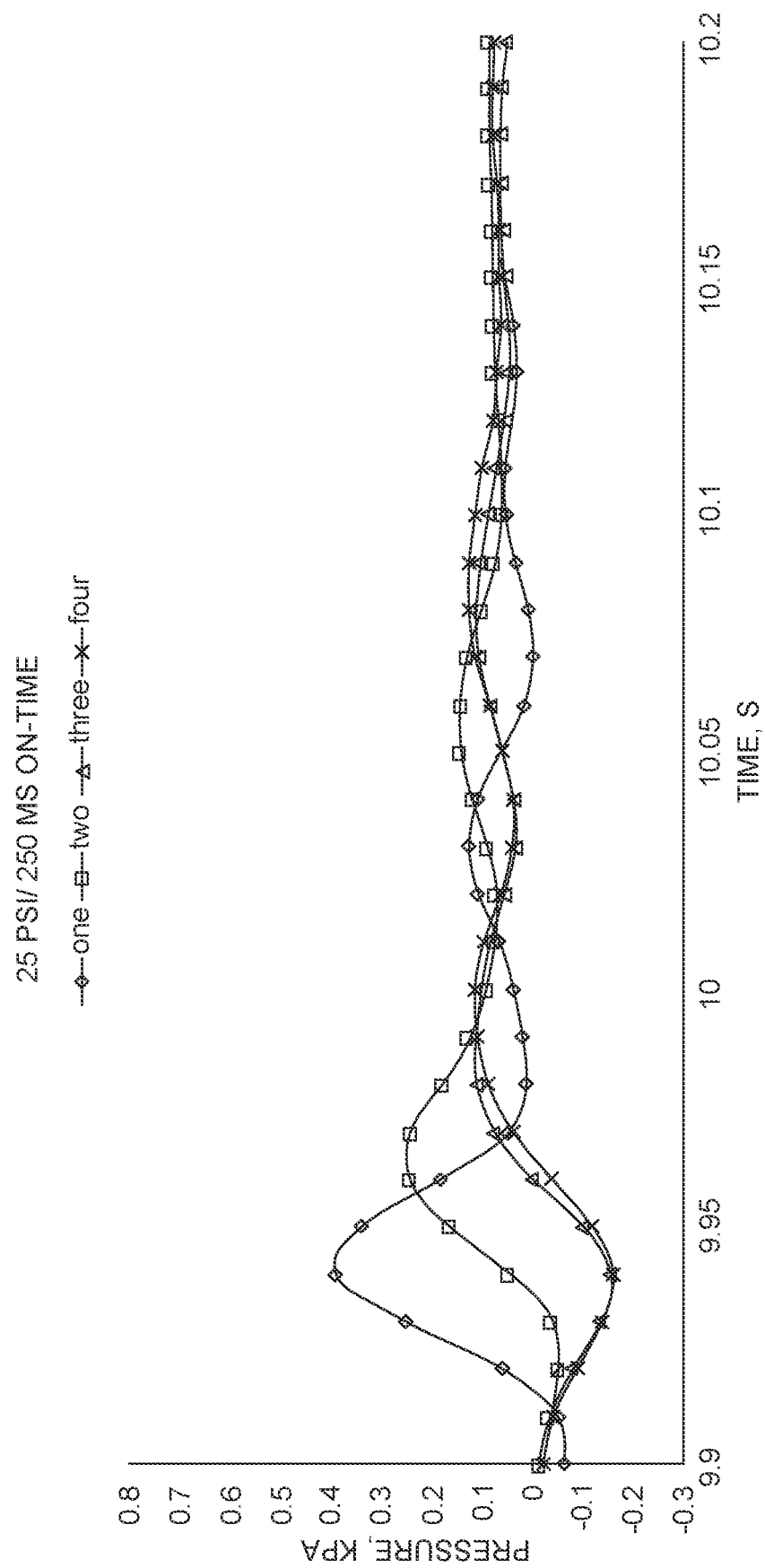
FIG. 7 is a line graph showing pressure (KPa) measured at various locations in a filter assembly according to prior art.

The polyester filter bag was fitted onto the support structure as described in FIGS. 2A and 2B, to simulate a bag house. A back pulse nozzle was adjusted to a distance of 15 cm above the filter bag opening for low pressure and high-volume pulsing. The back pulse consisted of a pressure of 172 kPa (25 psi) for a duration of 250 milliseconds. Data was measured by four pressure gauges in a laboratory scale baghouse as described above, at distances of 0.4, 1.0, 1.6, and 2.2 m from the top opening of the bag. FIG. 7 shows pressure measured at four different locations in a filter assembly, roughly corresponding to where the four pressure gauges were along a longitudinal direction of a filter assembly. The pressure measured in this embodiment according to prior art was relatively low at each location.

Example 2

Figure 8:
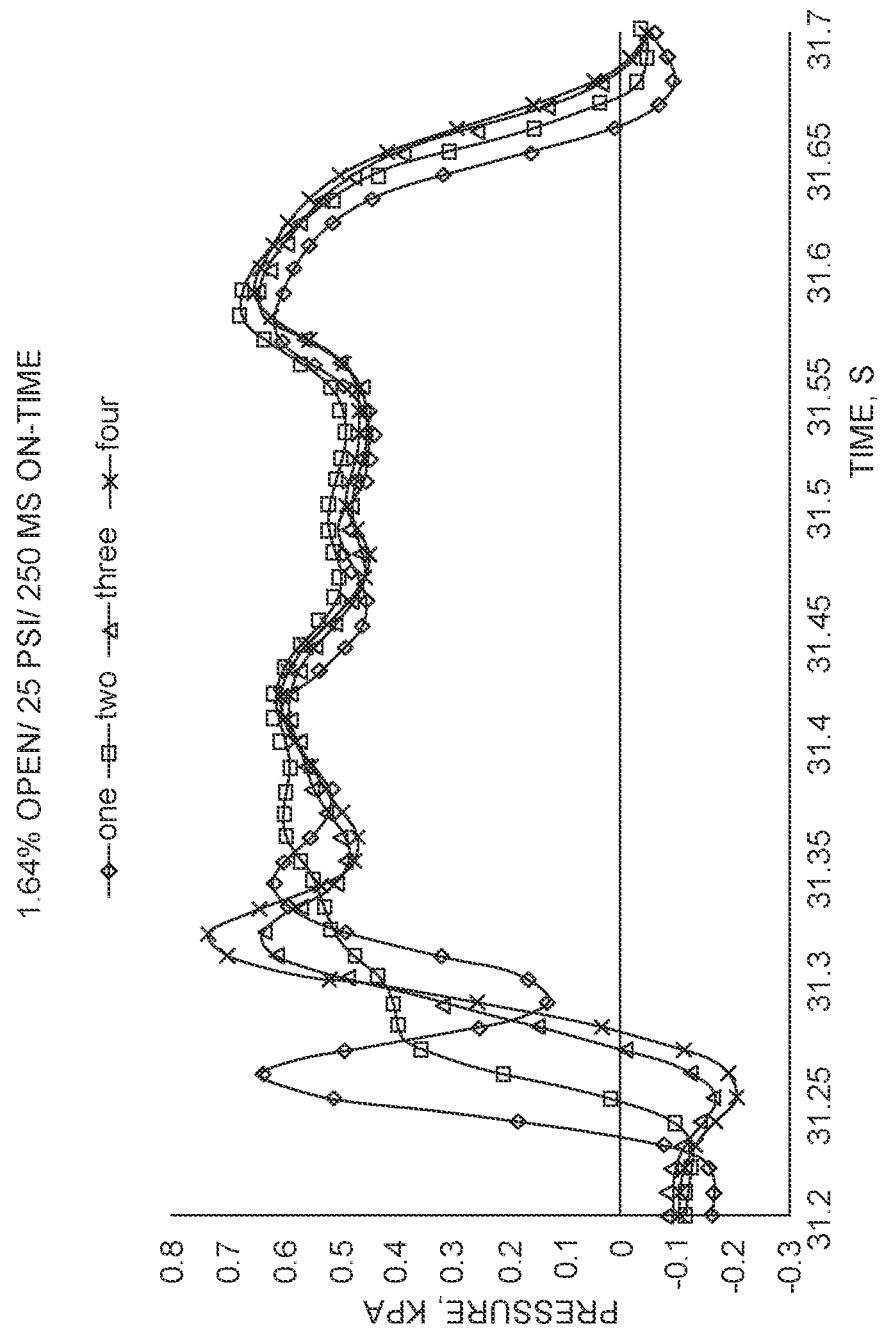
FIG. 8 is a line graph showing pressure (KPa) measured at various locations in a filter assembly, according to embodiments disclosed herein.

Flow control component #1 was fitted onto the support structure followed by the polyester filter bag to simulate a bag house as described in FIGS. 4A-D. The back pulse nozzle was adjusted to 15 cm above the bag opening for low pressure and high-volume pulsing. The back pulse consisted of a pressure of 172 kPa (25 psi) for a duration of 250 milliseconds. As shown in FIG. 8, the pressure measured in this embodiment was higher at each location compared to the prior art in FIG. 7.

Example 3

The data in this example was measured using the laboratory scale baghouse as described above. The polyester filter bag was fitted to the support structure. The back pulse nozzle was located at the opening of the filter bag. For test 1 (FIG. 9A), a 207 kPa (30 psi) pulse was used. For test 2 (FIG. 9B), a 414 kPa (60 psi) pulse was used. For test 3 (FIG. 9C), a 620 kPa (90 psi) pulse was used. The duration of each of these pulses was 100 milliseconds. In each test, only the third pressure transducer at 1.6 m from the opening of the filter assembly was active.

The experiment was then repeated, with flow control component #2 fitted to the support structure followed by the polyester filter bag. This filter assembly with the flow control component in place, was then tested at the same at 207, 414 and 620 kPa and 100 millisecond duration as was used above and the results were plotted in FIGS. 9A, 9B and 9C, respectively. In each of these tests, only the third pressure transducer at 1.6 m from the opening of the filter assembly was active.

The results of each of the tests described above were plotted in FIGS. 9A-C and show the pressure (kPa) measured at the location of the third pressure transducer down the length of the filter assembly versus time. The results in FIGS. 9A-C, show that the pressure measured in the filter assemblies with the flow control component are much higher compared to the prior art filter assembly without the flow control component.

Example 4

Example 4 measured the flow resistance in the forward and opposite direction and the pressure during the back pulse for various filter assemblies, using the Small Sample Measurements and Flow Resistance methods described above and the results are shown in Table 1. The pressure sensors used were Omega pressures sensors with an upper measurement limit of 7 kPa.

Sample 1 (comparative) was a polyester felt material having a weight of 542 gsm (16 oz/yd2) (available from Southern Felt Company, Augusta, South Carolina). A circular sample having a diameter of 140 mm was cut from a bulk sample of the polyester felt.

Sample 2 was the 140 mm circular polyester felt of sample 1 with a 140 mm circular flow control component made from a PFA/ePTFE composite film having a weight of 50 gsm and a density of 2.0 g/cc placed on the downstream side of the polyester felt. The flow control component had a single circular hole with a diameter opening size of 15.875 mm. The flow control component was arranged downstream of the filter component.

Sample 3 (comparative) was a GORE® filter bag 4427, a high durability filter assembly (available from W.L. Gore & Associates, Elkton, Maryland) that included a porous membrane. A circular sample having a diameter of 140 mm was cut from a bulk sample of the GORE® filter bag 4427.

Sample 4 was the same GORE® filter bag 4427 as described for sample 3 but with a flow control component made from a PFA/ePTFE composite film having a weight of 50 gsm and a density of 2.0 g/cc, and placed on the downstream side of the high durability filter assembly. The flow control component had a single circular hole having a diameter of 15.875 mm.

Sample 5 (comparative) was a GORE® LOW DRAG filter bag 4470 (available from W.L. Gore & Associates, Elkton, Maryland). A circular sample having a diameter of 140 mm was cut from a bulk sample of the GORE® LOW DRAG filter bag 4470.

Sample 6 was the same GORE® LOW DRAG filter bag 4470 low drag filter assembly but with a flow control component made from a PFA/ePTFE composite film having a weight of 50 gsm and a density of 2.0 g/cc, and placed on the downstream side of the Gore high durability filter assembly. The flow control component had a single circular hole having a diameter of 15.875 mm.

Each sample was tested for Flow Resistance in (min*Pa/m) in the forward (i.e., normal or forward) direction and the opposite (i.e., the second) direction using the small sample measurement equipment. Table 1 shows the flow resistance in the forward direction and the flow resistance in the opposite direction. It can be seen that those samples (2, 4 and 6) having the flow control component generate much higher resistance to flow in the second direction when compared to those comparative samples (1, 3, and 5) that do not have the flow control component. This effect then led to the highly increased pressure during the back pulse for all three assemblies.

TABLE 1

Flow Resistance and Pressure Measured for Samples 1-6

| Sample Number | Flow Direction | Flow Resistance (min*Pa/m) | Pressure (kPa) during back pulse (second/opposite direction) |
|---|---|---|---|
| 1 | Forward | 16.5 | |
|   | Opposite | 16.5 | 0.20 |
| 2 | Forward | 20 | |
|   | Opposite | 360 | >7 |
| 3 | Forward | 56.5 | |
|   | Opposite | 58 | 0.76 |
| 4 | Forward | 68 | |
|   | Opposite | 949.5 | >7 |
| 5 | Forward | 295 | |
|   | Opposite | 287 | 3.57 |
| 6 | Forward | 388 | |
|   | Opposite | 1232 | >7 |

Example 5

Filter assemblies 7-15 were produced. Filter assembly 11 was a comparative filter assembly made using the polyester filter bag and support structure described above, with no flow control component. Filter assemblies 7-10 and 12-15 further included a flow control component which was placed over the support structure, followed by the polyester filter bag. Each of the flow control components were made in the same manner and using the same film as described above for flow control components #1 and #2 but had circular openings having a diameter of 9.5 mm and frequencies to form flow control components with differing percent open areas, with the exception of flow control component 12 which had no openings. The flow control components had the following opening frequencies:

Flow Control Component 7—opening frequency 122 openings/m2.
Flow Control Component 8—opening frequency 149 openings/m2.
Flow Control Component 9—opening frequency 176 openings/m2.
Flow Control Component 10—opening frequency 230 openings/m2.
Flow Control Component 13—opening frequency 108 openings/m2.
Flow Control Component 14—opening frequency 216 openings/m2.
Flow Control Component 15—opening frequency 324 openings/m2.
Flow Control Component 16—opening frequency 446 openings/m2.

For each filter assembly 7-10 and comparative 11, the flow resistance and face velocity during normal operation (i.e., first direction) was measured using the baghouse measurement procedures described above. The data is summarized in Table 2 for the face velocity and flow resistance. The flow resistance in min*Pa/m was measured in the normal direction (first direction) at a constant fan speed, which resulted in different face velocities for the different samples.

For each of filter assemblies 12-16 and comparative 11, pressure data was measured at the third sensor location (1.6 m) using pulse jet pressures (i.e., in the second direction) of 207 kPa, 414 kPa and 620 kPa. The pressure was measured at the location of the third pressure sensor (1.6 m) along the length of the bag during the back pulse.

TABLE 2

Flow Resistance Measured in normal direction for Filters with Different Percentage Openings

| Filter Assembly | Percentage open area of flow control component | Face Velocity (m/min) | Flow resistance (min*Pa/m) |
|---|---|---|---|
| 7 | 0.87% | 4.3 | 91.7 |
| 8 | 1.06% | 4.6 | 81.5 |
| 9 | 1.25% | 4.7 | 78.7 |
| 10 | 1.64% | 5.8 | 60.2 |
| 11 (comparative) | 100% (no flow control component present) | 6.3 | 51.6 |

TABLE 3

Pulse Pressure Measured for Filters with Different Percentage Openings

| Sample | % Open Area of the flow control component | Pressure of sensor during 207 kPa pulse | Pressure of sensor during 414 kPa pulse | Pressure of sensor during 620 kPa pulse |
|---|---|---|---|---|
| 12 | 0.00% | 13.85 | 18.76 | — |
| 13 | 0.77% | 7.26 | 10.50 | 13.29 |
| 14 | 1.54% | 4.39 | 7.08 | 10.11 |
| 15 | 2.31% | 2.68 | 5.03 | 7.22 |
| 16 | 3.18% | 2.46 | 4.98 | 6.28 |
| 11 (comparative) | | 0.34 | 0.47 | 0.53 |

As the two tables illustrate, the flow control component added a low additional flow resistance to the forward flow direction while increasing the opposite flow resistance considerably. This effect then led to the highly increased pressure during the back pulse for all assemblies.

Example 6

Example 6 measured the pulse pressure in two filter assemblies at various depths along the longitudinal axis of the filter assembly. The comparative example, with no flow control component, was the GORE® filter bag 4427 and the example was the same GORE® filter bag 4427 with the addition of a flow control component made from a PFA/ePTFE composite film having a weight of 50 gsm and a density of 2.0 g/cc. The film had 9.525 mm (⅜ inch) openings at a frequency of 549 openings/m$^2$ for a 3.92% open area. These filter assemblies were tested using the small bag house testing procedure provided above with the exception that the back pulse was introduced through orifice nozzles having a diameter of 6.35 mm instead of the 12.7 mm orifice. Back pulse pressures of 482 kPa (70 psi), for the example with the flow control component and 682 kPa (90 psi), for the comparative example without the flow control component were used to try to arrive at similar pressures at the sensor located at 1.6 m. FIG. 10 is a line graph showing a comparison between pressure (KPa) measured at various locations in the corn partitive filter assembly versus a filter assembly with a flow control component according to embodiments disclosed herein. The y axis shows pressure and the x axis shows length measured down the filter assembly. From this example, it can be seen that the example with the flow control component generated higher and more uniform pressures along the longitudinal axis of the filter assembly, despite using a lower back pulse pressure when compared to the comparative example.

As shown by line 1002, the filter assembly according to embodiments disclosed herein has a more even pressure distribution along the length of the filter assembly compared to prior art shown by line 1004. Therefore, the use of the flow control component lowers the peak pressure at the inlet of the filter assembly and also increased the pressure at the outlet of the filter assembly to enable a more even pressure distribution along the length of the filter assembly, thus allowing more efficient cleaning.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A filter assembly for filtering particulates comprising:
    a support structure;
    a tube-shaped filter component; and
    a flow control component;
    wherein the filter assembly is capable of having a direction-dependent flow resistance having a first flow resistance in a first direction when exposed to a first fluid stream and a second flow resistance in a second direction when exposed to a second fluid stream,
    wherein the flow control component comprises a porous or non-porous sheet-like material; and
    wherein the flow control component is positioned between the support structure and the tube-shaped filter component or wherein the support structure is positioned between the flow control component and the tube-shaped filter component.

2. The filter assembly of claim 1, wherein the first fluid stream is a gas stream comprising particulates, and wherein the second fluid stream is the same or different.

3. The filter assembly of claim 1, wherein the second fluid stream has a pressure of from 0.20 to 760 kPa.

4. The filter assembly of claim 1, wherein a ratio of the first flow resistance to the second flow resistance ranges from less than 0.01% to 99%.

5. The filter assembly of claim 1, wherein the flow control component modulates an amount of the second fluid stream flowing through the filter component by altering a surface area of the filter component that is exposed to the second fluid stream.

6. The filter assembly of claim 1, wherein the flow control component of the filter assembly is configured to increase a pressure of the second fluid stream flowing in the second direction.

7. The filter assembly of claim 1, wherein the flow control component is disposed downstream of the filter component with respect to the first direction of the first fluid stream.

8. The filter assembly of claim 1, wherein the flow control component is configured to alternate between a slack non-masking state and an expanded masking state relative to the filter component.

9. The filter assembly of claim 8, wherein when the flow control component is in the expanded masking state at least a portion of a flow control surface of the flow control component is in contact with a surface of the filter component.

10. The filter assembly of claim 1, wherein the flow control component comprises a plurality of flow control passages.

11. The filter assembly of claim 10, wherein the flow control component has a percentage open area of from 0.01% to 50% compared to the total surface area of the flow control component.

12. The filter assembly of claim 10, wherein the plurality of flow control passages comprise openings with an average size of from 0.0001 to 100,000 mm$^2$.

13. The filter assembly of claim 1, wherein the flow control component comprises at least one flow control passage capable of being in an open state or a closed state.

14. The filter assembly of claim 13, wherein the plurality of flow control passages comprises one or more flaps.

15. The filter assembly of claim 1, wherein the first fluid stream passing through the filter assembly in the first direction experiences a first flow resistance of less than 4,000 (min*Pa)/m.

16. The filter assembly of claim 15, wherein the second fluid stream passing through the filter assembly in the second direction experiences a second flow resistance of more than 10 (min*Pa)/m.

17. The filter assembly of claim 1, wherein the filter assembly is cleanable by a reverse air, a shaker, or a pulse-jet method.

18. The filter assembly of claim 1, wherein the sheet-like material comprises a silicone, a silicone elastomer, a fluorocarbon, a fluorocarbon elastomer, a microporous polymer that has been densified or filled to remove at least some of the pores, a polyacrylate, an ethylene (meth)acrylic copolymer, a polyimide, a polyether ether ketone (PEEK), a polyester, polybutylene terephthalate, polyethylene terephthalate, a microporous polymer, wherein the polymer is polytetrafluoroethylene (PTFE), polypropylene (PP), polyethylene (PE), expanded PTFE, fluorinated ethylenepropylene (FEP), perfluoroalkoxy polymer (PFA), ultra-high molecular weight polyethylene (UHMWPE), nitrocellulose, triacetyl cellulose, polyimide, polycarbonate, polysulfone, polyvinyl chloride, polyvinylidene fluoride, acrylate copolymer, or a combination thereof.

19. The filter assembly of claim 18, wherein the sheet-like material has a flow resistance larger than 16.5 (min*Pa)/m.

20. A method of cleaning a bag house filter system, the method comprising:
    providing a cleaning fluid stream at a pressure of from 0.20 to 760 kPa through one or more of the filter assemblies of claim 1, thereby causing an expansion of the flow control component;
    wherein the expansion exerts and dissipates mechanical pressure on the filter component in response to a cleaning pulse, thereby inducing cleaning of the filter component.

21. A flow control component for use in a filter assembly, comprising:
- one or more flow control passages;
- wherein the filter assembly comprises a support structure and a tube-shaped filter component, and has a direction-dependent flow resistance characterized by a first flow resistance in a first direction and a second flow resistance in a second direction when exposed to a fluid stream,
- wherein the flow control component comprises a porous or non-porous sheet-like material; and
- wherein the flow control component is positioned between the support structure and the tube-shaped filter component or wherein the support structure is positioned between the flow control component and the tube-shaped filter component.

22. The flow control component of claim 21, wherein the flow control component has a percentage open area of from 0.01% to 50% compared to the total area of the flow control component.

23. The flow control component of claim 22, wherein, as the percentage open area of the flow control component decreases, the difference between the first flow resistance and the second flow resistance increases.

24. The flow control component of claim 21, wherein the flow control passages include openings having an average size of from 0.0001 to 100,000 mm$^2$.

25. The flow control component of claim 24, wherein, as the average size of openings decreases, the difference between the first flow resistance and the second flow resistance increases.

26. The flow control component of claim 24, further comprising one or more flaps such that the one or more flow control passages are capable of being in an open state or a closed state.

* * * * *